(12) United States Patent  
Malin

(10) Patent No.: US 12,019,847 B2  
(45) Date of Patent: Jun. 25, 2024

(54) CONTACTLESS INTERACTIVE INTERFACE

(71) Applicant: James Christopher Malin, Temecula, CA (US)

(72) Inventor: James Christopher Malin, Temecula, CA (US)

(*) Notice: Subject to any disclaimer, the term of this patent is extended or adjusted under 35 U.S.C. 154(b) by 0 days.

(21) Appl. No.: 17/938,631

(22) Filed: Oct. 6, 2022

(65) Prior Publication Data

US 2023/0112984 A1  Apr. 13, 2023

Related U.S. Application Data

(60) Provisional application No. 63/375,364, filed on Sep. 12, 2022, provisional application No. 63/366,059, (Continued)

(51) Int. Cl.
*G06T 7/70* (2017.01)
*G06F 3/0482* (2013.01)

(52) U.S. Cl.
CPC ............ *G06F 3/0482* (2013.01); *G06T 7/70* (2017.01); *G06T 2200/24* (2013.01); *G06T 2207/10048* (2013.01); *G06T 2207/30201* (2013.01)

(58) Field of Classification Search
CPC ..... G06F 3/0482; G06T 7/70; G06T 2200/24; G06T 2207/10048; G06T 2207/30201
See application file for complete search history.

(56) References Cited

U.S. PATENT DOCUMENTS 5,594,469 A    1/1997   Freeman et al.
6,498,628 B2  12/2002  Iwamura
(Continued)

FOREIGN PATENT DOCUMENTS

CN    210983359    7/2020
EP      2144448    1/2010
(Continued)

OTHER PUBLICATIONS

Arieal display device, WO2017125984A1, google translation, pp. 1-10 (Year: 2017).*

(Continued)

*Primary Examiner* — Hien L Duong
(74) *Attorney, Agent, or Firm* — Knobbe, Martens, Olson & Bear, LLP

(57) ABSTRACT

Systems, and methods relating to, a contactless interface apparatus. An interface can include an image system having a display and an optical device for generating a floating image depicting information rendered on the display. The interface includes a first sensor assembly configured to sense information indicative of a physical characteristic of a user and to generate a first signal corresponding to the sensed information, and a second sensor assembly configured to sense a position of a user interaction with the floating image. The interface also includes a controller in communication with the image system, the controller configured to receive the first signal, determine position information based on the first signal indicative of a position for displaying the floating image, and communicate the position information to the image system. The image system is configured to generate the floating image based on the position information.

20 Claims, 32 Drawing Sheets

Related U.S. Application Data filed on Jun. 8, 2022, provisional application No. 63/365,678, filed on Jun. 1, 2022, provisional application No. 63/269,175, filed on Mar. 11, 2022, provisional application No. 63/268,310, filed on Feb. 21, 2022, provisional application No. 63/262,385, filed on Oct. 11, 2021.

(56) References Cited

U.S. PATENT DOCUMENTS

| | | | |
|---|---|---|---|
| 7,054,045 | B2 | 5/2006 | McPheters et al. |
| 8,434,872 | B2 | 5/2013 | Maekawa |
| 8,867,136 | B2 | 10/2014 | Hashikawa |
| 8,905,546 | B2 * | 12/2014 | Shimatani ......... G02F 1/133524 359/479 |
| 9,459,697 | B2 | 10/2016 | Bedikian et al. |
| 9,916,009 | B2 | 3/2018 | Zagorsek et al. |
| 10,275,096 | B2 | 4/2019 | Otsubo |
| 11,169,610 | B2 | 11/2021 | Sarafianou et al. |
| 11,221,680 | B1 | 1/2022 | Clements |
| 11,385,595 | B2 * | 7/2022 | Kim ...................... G03B 21/00 |
| 2006/0115157 | A1 * | 6/2006 | Mori ................... G06V 40/174 382/118 |
| 2009/0005961 | A1 | 1/2009 | Grabowski et al. |
| 2010/0110384 | A1 * | 5/2010 | Maekawa ............. G03B 35/18 353/10 |
| 2012/0236269 | A1 * | 9/2012 | Yoneno ................ H04N 13/302 353/102 |
| 2013/0326422 | A1 * | 12/2013 | Kang .................... G06F 3/0481 715/810 |
| 2015/0244747 | A1 * | 8/2015 | Wickenkamp ........ G06F 3/0482 726/28 |
| 2015/0312546 | A1 * | 10/2015 | Hasegawa ............ H04N 13/373 348/59 |
| 2016/0195849 | A1 * | 7/2016 | Takagi ..................... G06F 3/017 348/40 |
| 2016/0307324 | A1 * | 10/2016 | Nakada .................... G06T 5/008 |
| 2016/0371535 | A1 * | 12/2016 | Li ........................ G06V 40/172 |
| 2017/0227928 | A1 * | 8/2017 | Suginohara .......... G03H 1/0005 |
| 2018/0088969 | A1 * | 3/2018 | VanBlon ................. G06F 3/017 |
| 2018/0276939 | A1 * | 9/2018 | Keilwert ............. H04N 13/366 |
| 2020/0042097 | A1 | 2/2020 | O'Brien |
| 2020/0150588 | A1 | 5/2020 | Seo et al. |
| 2021/0200321 | A1 * | 7/2021 | Kaede .................... G02B 30/56 |
| 2021/0271293 | A1 * | 9/2021 | Rakshit .................. B25J 9/1664 |
| 2022/0137428 | A1 * | 5/2022 | Krauthamer ......... H04N 9/3179 348/744 |
| 2022/0270287 | A1 * | 8/2022 | Ohno ........................ G06T 7/73 |
| 2022/0397762 | A1 * | 12/2022 | Bae .................... G02B 27/0103 |

FOREIGN PATENT DOCUMENTS

| | | | |
|---|---|---|---|
| WO | WO 2014/038303 | 3/2014 | |
| WO | WO-2017125984 A1 * | 7/2017 | ............. G02B 27/22 |
| WO | WO 2019/163339 | 8/2018 | |

OTHER PUBLICATIONS

International Search Report and Written Opinion issued in application No. PCT/US2022/0006047, mailed Feb. 3, 2023.

* cited by examiner

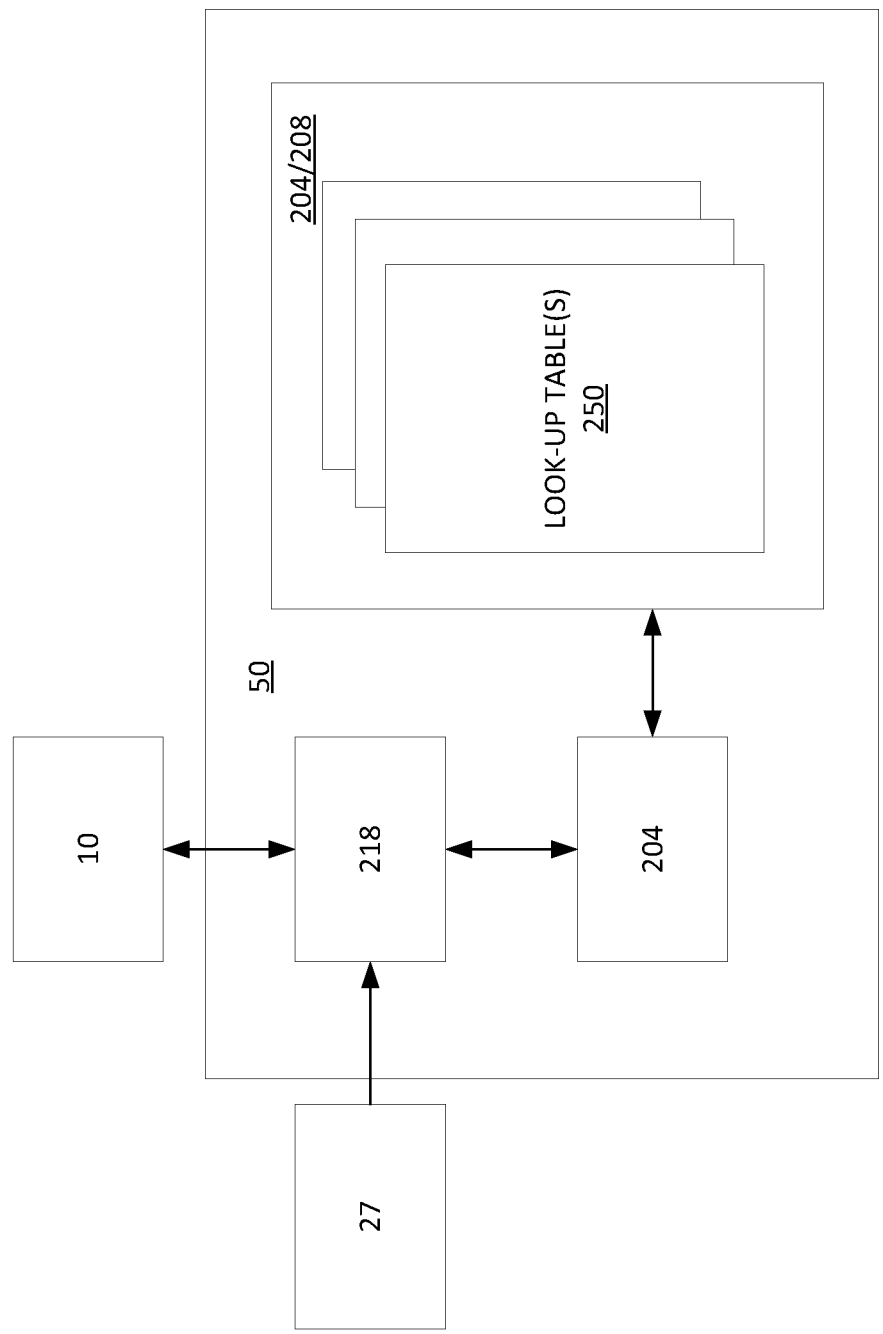

$$\begin{bmatrix} X \\ Y \\ Z \end{bmatrix} = R \begin{bmatrix} U \\ V \\ W \end{bmatrix} + t$$

$$\Rightarrow \begin{bmatrix} X \\ Y \\ Z \end{bmatrix} = [R \mid t] \begin{bmatrix} U \\ V \\ W \\ 1 \end{bmatrix}$$

$$\begin{bmatrix} X \\ Y \\ Z \end{bmatrix} = \begin{bmatrix} r_{00} & r_{01} & r_{02} & t_x \\ r_{10} & r_{11} & r_{12} & t_y \\ r_{20} & r_{21} & r_{22} & t_z \end{bmatrix} \begin{bmatrix} U \\ V \\ W \\ 1 \end{bmatrix}$$

CONTACTLESS INTERACTIVE INTERFACE

RELATED APPLICATIONS

This application is related to U.S. Provisional Application Nos. 63/262,385 filed on Oct. 11, 2021, 63/268,310 filed on Feb. 21, 2022, 63/269,175 filed on Mar. 11, 2022, 63/365,678 filed on Jun. 1, 2022, 63/366,059 filed on Jun. 8, 2022, and 63/375,364 filed on Sep. 12, 2022, all of which are incorporated herein by reference in their entirety. Any and all applications for which a foreign or domestic priority claim is identified in the Application Data Sheet, filed with the present application, are hereby incorporated by reference under 37 CFR 1.57.

TECHNICAL FIELD

The present disclosure relates to systems and techniques for generating an image that is perceived by a user to be floating (a "floating image"), positioning the floating image based on sensed user information, and receiving user selections of portions of the floating image, including gestures and inputs made at a distance from the floating image

BACKGROUND

Light-emitting devices are becoming increasingly popular to support a range of applications. Mobile phones, tablets, desktop computers, laptop computers, wearable devices, smart devices, vehicle cabins, home entertainment systems, industrial equipment, thermostats, lighting devices, and household appliances, are just some examples of light-emitting devices users interact with regularly. Such light emitting devices (or "means of illumination") typically include a display, a user interface, a processor, and one or more programs that are controlled by a user's input. The user interface is configured to receive input via a user's physical contact with buttons, a touch-sensitive surface, a mouse, a keypad, a keyboard, and the like.

COVID-19 and its variants have demonstrated that infectious disease pandemics are a real danger. Although people are more aware of hygiene than ever before, we still face infection risks from contact with surfaces of controls that we physically interact with to operate a device. In mid-to-high foot traffic areas, elevators, electronic kiosks, food ordering machines, vending machines, cars, in homes and businesses, interfaces requiring a touch input to actuate a feature are regularly used. Accordingly, it would be advantageous for preventing, or minimizing, the spread of infectious diseases to be able to interact with devices without actually touching the controls of the device.

SUMMARY

Embodiments of systems and methods of providing a contactless interactive holographic interface ("contactless interface" or "interface") are disclosed herein. The interface eliminates the need for physical contact, while not requiring users to change their behavior in any significant way.

Implementations of the contactless interface may include generating a floating two-dimensional (2D) or three-dimensional (3D) image that a user can interact with to provide input of a selection on the floating image, where the position of the floating image is generated at is based on sensed information associated with the user. In other words, information relating to a physical characteristic of the user is sensed, and the contactless interface uses this information to move a portion or portions of the contactless interface to generate the floating image at a certain position. For example, to have a certain tilt such that the user can best perceive the floating image, and/or to be in a certain location with respect to the user (e.g., such that a plane of the floating image is directed towards the location of the user). The interface can detect a portion (e.g., a location) of the floating image that a user interacts with by "touching" the floating image (e.g., with a finger, hand, object, etc.) enabling an operation of indication to be determined as it crosses through or touches a point on the floating image in air, and recording and/or processing the X, Y-coordinates and/or X, Y, Z-coordinates on the floating image as input, providing a hygienic method for operating a device. The interface generates the floating image based on the sensed user information to determine a "best" position to generate the floating image such that it can be seen by the user. An image system of the contactless interface can include a display and an optical device that are used to generate the floating image. The image system can include a positional assembly that can move either the display or the optical device which changes the position of the floating image. In some embodiments, a positional assembly is coupled to the display and can rotate the display around an axis, and/or move the display in any one or more of an x, y, z-direction. In some embodiments, a positional assembly is coupled to the display and can rotate the optical device around an axis, and/or move the display in any one or more of an x, y, z-direction.

One innovation includes a contactless interface apparatus, comprising: an image system configured to generate a floating image, the interface including a light-emitting display; and an optical device configured to form a floating image at a position relative to the position of the display, the optical device having a first side and a second side, the first side aligned with the display to receive light emitted from the display and the second side configured to propagate light away from the optical device to form the floating image; a first sensor assembly configured to sense information indicative of a physical characteristic of a user, and to generate a first signal corresponding to the sensed information; a second sensor assembly configured to sense a position of a user interaction with the floating image; and a controller having a computer hardware processor in communication with the image system, the controller configured to receive the first signal, determine position information indicative of a position for displaying the floating image based on the first signal, and communicating the position information to the image system, wherein the image system is further configured to generate the floating image based on the position information. In some embodiments, the physical characteristic is a height of the user. In some embodiments, the physical characteristic is a position of the user's eyes. In some embodiments, the physical characteristic is a position of the user relative to the contactless interface apparatus. In some embodiments, the physical characteristic is a distance of the user relative to the contactless interface apparatus. In some embodiments, the physical characteristic is one or more hand gestures of the user that are not interactions with the floating image.

Other embodiments of a contactless interface can include additional features. In some embodiments, the image system comprises a positional assembly in communication with the controller, the image system further configured to receive the position information from the controller to and change the relative alignment of the light emitting display and the optical array based on the position information to change the position of the floating image. In some embodiments, the positional assembly is configured to rotate the display to change an angular alignment of the display relative to the optical device based on the position information. In some embodiments, the positional assembly is configured to move the display in at least one of an x, y, or z direction to change a position of the display relative to the optical device based on the position information. In some embodiments, the image system comprises a positional assembly coupled to the optical device and configured to move the optical device based on the position information. In some embodiments, the positional assembly is configured to rotate the optical device to change an angular alignment of the optical device relative to the display based on the position information. In some embodiments, the positional assembly is configured to move the optical device in at least one of an x, y, or z direction to change a position of the optical device relative to the display based on the position information. In some embodiments, the image system comprises a positional assembly coupled to the display and the optical device, and configured to move one or both of the display and optical device based on the position information to change the position of the floating image. In some embodiments, the first sensor assembly comprises an infrared sensor.

In some embodiments of a contactless interface, the first sensor assembly comprises a camera, and wherein the controller is configured to generate the control signal using image processing software that identifies one or more of the user's height, position of the user's eyes, position of the user relative to the position of the floating image, or a user hand gesture. In some embodiments, the second sensor assembly comprises an infrared (IR) sensor array. In some embodiments, the optical device is a transmissive dihedral corner reflector array.

Another innovation includes a method of providing a contactless interface, the method comprising: sensing, with a first sensor assembly, first information of a physical characteristic of a user who is in proximity of the contactless interface; and generating a floating image in a first position on the floating image contactless interface based on the sensed information of a physical characteristic of the user. In some embodiments, the method further comprises sensing, with a second sensor assembly, a user interaction with the floating image, and generating a signal indicative of a user selection of a portion of the floating image based on the user interaction, and communicating the signal as a user input. In some embodiments, the method further comprises sensing second information of a physical characteristic of a user who is in the proximity of the contactless interface, and generating a floating image in a second position based on the second information.

BRIEF DESCRIPTION OF THE DRAWINGS

The features and advantages of the holographic touchless interface apparatus and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

FIG. 2C is a block diagram illustrating an example of a controller receiving user information from a user sensor, determining positional information from the user information, and providing the positional information to an image system to generate a floating image based on the positional information.

DETAILED DESCRIPTION OF CERTAIN INVENTIVE ASPECTS

Figure 1:
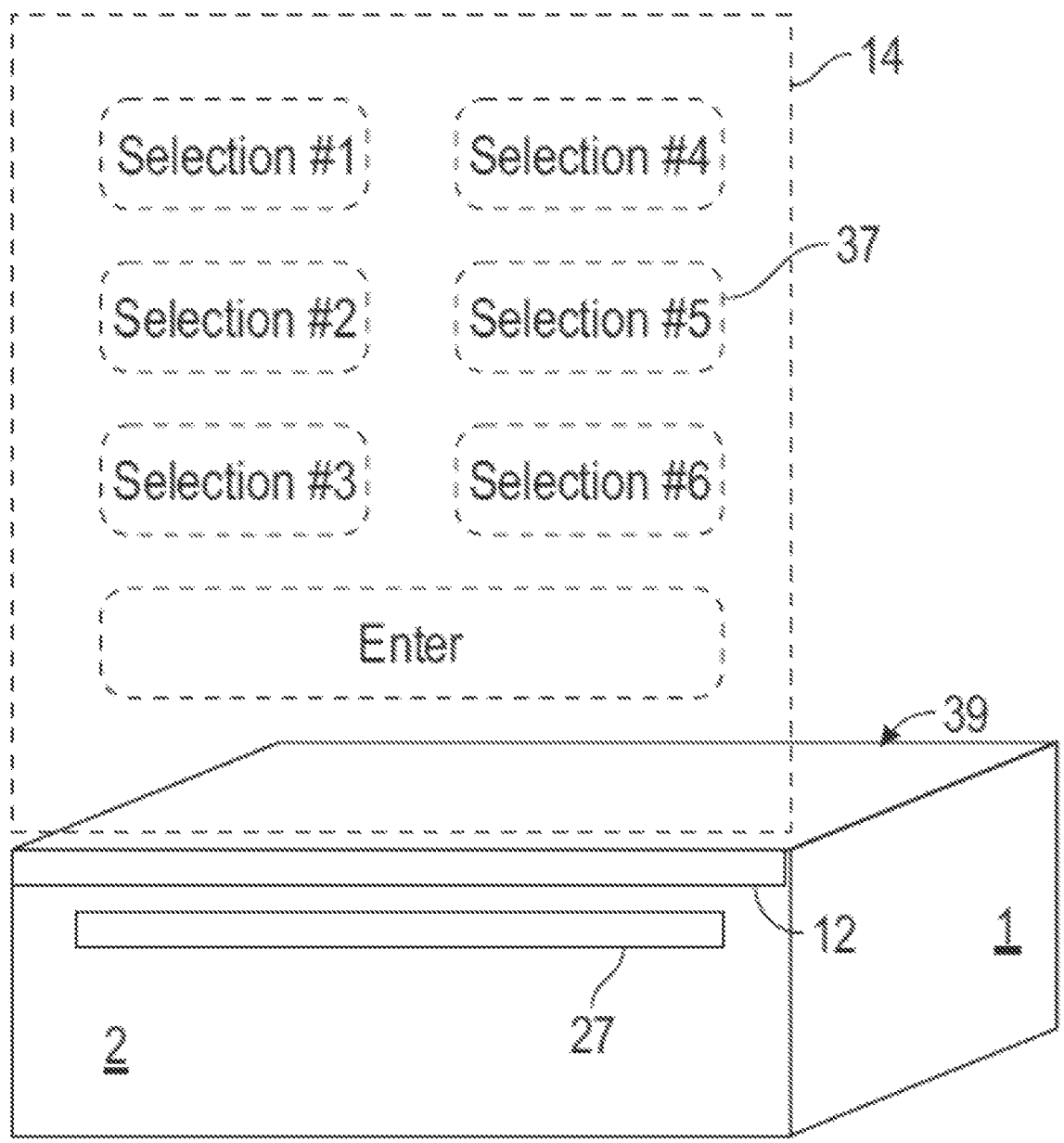
FIG. 1 is an example of a contactless interface apparatus that is configured to generate a touchless interface that is perceived by the user as a floating image, and further configured to receive selections by a user of portions of the floating image.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. The structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Implementations of the contactless interface include generating a floating image that a user can interact with to provide input of a selection on the floating image. In some embodiments, the floating image as a two-dimensional image. In some embodiments, the floating image is a three-dimensional image. These implementations are advantageous over other floating image interfaces at least because the interface determines a position of the floating image based on sensed information associated with a user, and generates the floating image in the determined position. The interface detects a user interaction with the floating image such that the user's interaction with the floating image can be used as an input to a computing device or process, similar to a user's interaction with a touch panel except it is a contactless interaction. The interface is configured to detect a portion of the floating image that a user interacts with by "touching" the floating image (e.g., with a finger, hand, object, etc.) enabling an operation of indication to be determined as it crosses through or touches a point on the floating image in air, and recording and/or processing the X/Y coordinates on the floating image as input, providing a hygienic method for operating a device. In some embodiments, the interface can recognize objects (e.g., using the user sensor). In some embodiments, the interface is also configured to sense a QR code, a bar code, and/or perform facial recognition (e.g., when the touch sensor, or the user sensor, includes an image generating sensor).

The interface generates the floating image in a certain position and/or location based on sensed user information to determine a "best" position to generate the floating image such that it can be seen by the user. The sensed user information can include information about the location of the user to determine an estimated location of the user's eyes. Accordingly, the sense user information can include any information indicative of the location of the user's eyes. For example, the user's height, the distance of the user from the interface, the location of the user's head, and specifically the location of the user's eyes. The interface can also send user information related to hand gestures to control the user interface, for example, to control the position and/or the location to generate a floating image which the user can interact with.

In some embodiments, contactless interface includes a first sensor assembly configured to sense the user information, and a second sensor assembly configured to sense the user's interaction with the floating image. The sensor assemblies communicate with the controller that is configured to receive sensed user information from the first sensor assembly and determine a position for an image system to generate the floating image. The image system can include a display and an optical device aligned relative to the display such that the optical device receives light emitted from the display propagates light that forms the floating image. The display can be any type of light emitting panel. The display can include any type of light-emitting technology including for example LED's, LCD, OLED, plasma, cathode ray tube (CRT), and the like. In some embodiments, the "display" includes a display panel positioned in the image system, and a reflective surface that reflects light emitted from the display panel to the optical device. In some embodiments, the user can use their own display (e.g., cell phone, tablet) and position its display in the contactless interface such that it emits light towards the optical device and the optical device generates a floating image. In another example, a user can stream their device (e.g., mobile computing device) to the display in the user interface. In an example, the optical device includes a dihedral corner array (DCA). For example, a DCA as described in U.S. Pat. Nos. 8,434,872 and 8,724,224, each of which is incorporated by reference herein in its entirety.

The image system can also include a positional assembly that is coupled to one or both of the display in the optical device, and can move the display an optical device relative to each other to generate a floating image in different positions. The controller communicates with the positional assembly to control the positioning of the optical device and display relative to each other to generate a floating image that is based on the sensed user information, providing the floating image in position to best be seen by the user. In some embodiments, the positional assembly moves components of the image system to change the angle of the floating image (e.g., of the plane in which the floating image is perceived to be) relative to the user such that the floating image can be seen more clearly by the user (e.g., the floating image is brighter as more light propagating from the optical device and to the user's eyes). In various embodiments, a positional assembly is coupled to the display and can rotate the display around an axis, and/or move the display in any one or more of an x, y, z-direction, or is coupled to the optical device and can rotate the optical device around an axis, and/or move the optical device in any one or more of an x, y, z-direction. In some embodiments, the positional assembly is coupled to the optical device and the display, and can rotate the optical device and/or the display around an axis, and/or move the optical device and/or the display in any one or more of an x, y, z-direction. In other embodiments, positional assembly is coupled to the image system, and can move the image system (e.g., can rotate the image system around an axis, and/or move the image system in any one or more of an x, y, z-direction) based on information received from the controller. The second sensor assembly can be moved, if necessary, correspondingly to the position of the floating image such that it can detect the user's interaction with the floating image. Accordingly, different embodiments can include a positional assembly that can move and/or change the orientation of (1) a display and a touch sensor; (2) the whole interface; (3) the display, user sensor, and the whole interface; (4) the user sensor and optical device; (5) the user sensor, optical device, and whole interface; (6) the user sensor, the optical device, the display, and the whole interface; the optical device and the whole interface; (8) the optical device and the whole interface; and (9) the display and the whole interface Embodiments of a contactless interface provide a hygienic method and apparatus for interacting with a display on a computer system, or example, tablets, phones, laptops, computers, microcomputers, TVs, ATMs, medical devices, manufacturing controls, and other electronic devices into touchless enabled devices. Some embodiments are implemented as a wearable device that is useful in not requiring a user to retrieve a device from their pocket or elsewhere that may or may not be on their body and allows them to conveniently interact with the device strapped to their body, such as during physical activity (e.g., jogging, working out, etc.). The wearable interactive apparatus may be strapped to the user's arm, leg, hand, waste, head, or another part of the body. The wearable interactive apparatus may also be embedded in a hat, arm band, glasses, or another wearable or article of clothing. This wearable embodiment works by allowing a user to strap or otherwise attach a light-emitting device including, inter alia, tablets, phones, computers, microcomputers, and like light-emitting devices to their body that they can reach, such as their arm. Such embodiments allow the interface to communicate with other computers (e.g., external to the interface) such that the interface provides user input information to the other computers. That is, the contactless interface allows a user to interact with the floating image and communicate with the other computer (e.g., a smart phone that may be in the user's pocket or elsewhere. In another embodiment, the user can use their device (e.g., cell phone, or tablet computer) and plug it into the wearable device, or instead of needing the display built into the wearable device.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Actuation sensor or Touch Sensor (second sensor assembly): one or more sensors that are configured to sense a user interaction with the floating image, and in particular, to sense information that can be used to determine what portion of the floating image the user interacted with (e.g., one or more holographic buttons depicted in the floating image). In some examples, the actuation sensor is positioned on the contactless interface such that it is along the bottom portion of the floating image. In other examples, it can be positioned in other areas. In an example, the actuation sensor comprises an IR sensor array. In another example, the actuation sensor comprises one or more cameras. In other examples, the touch sensor can include ultrasonic, vertical-cavity surface-emitting laser (VCSEL), and/or light detection and ranging (LIDAR) sensors. In some embodiments, the touch sensor functionality can be performed by the same sensor assembly as the user sensor such that the first sensor assembly is also the second sensor assembly. For example, by using a camera, webcam and the like as the first sensor assembly and the second sensor assembly. In some embodiments, the touch sensor can be configured to also scan barcodes, QR codes, and the like.

Contactless Interface (or Touchless Interface): an interface that is configured to provide a floating image (e.g., a holographic image) that is perceivable by a user when the user is at a certain location with respect to the interface (e.g., the user's eyes are at a certain location or position relative to the interface), and configured to determine a user's interactions with the floating image as an input to control a device. The contactless interface is further configured to determine information related to a user, and use the information to position the floating image so that the user can perceive the floating image. In various embodiments, the contactless interface can use a "user sensor" to sense one or more physical characteristics of the user, for example, the user's height, the location of the user's eyes, and/or the proximity (e.g., distance) from the interface, etc. Examples of uses of the contactless interface include, but are not limited to, elevators, electronic kiosks, food ordering machines, automated teller machines (ATM), vending machines, cars, and anywhere else in a home, business, or a vehicle where interfaces requiring a touch input to actuate a feature are regularly used.

Controller: a system that includes one or more computer hardware processors, and that is in communication with non-transitory memory that stores instructions that the computer hardware processor(s) may execute to perform a process for operating a contactless interface. In an example, the controller may control the position of the floating image. For example, the controller communicate with one or more assemblies of the contactless interface (e.g., one or more positional assemblies) to move the entire interface (e.g., see FIG. 8B), the display, the optical array, the touch sensor, and/or the user sensor in a rotational direction and/or or in an x, y, z-directions, based on the position of the floating image. In some embodiments, the touch sensor and/or the user sensor are in the image system, and the controller communicates with a positional assembly in the image system to move the touch sensor and/or the user sensor correspondingly with the position of the floating image. In some embodiments, the touch sensor and/or the user sensor are not in the image system, and the controller communicates with one or more positional assemblies to move the touch sensor and/or the user sensor correspondingly with the position of the floating image and/or a position of the user. In some embodiments, the controller can communicate with a computing device external to the contactless interface (e.g., via a wired or wireless connection (e.g., Bluetooth) and provide information from the external computing device on the display. In some embodiments, the external computing device is a cell phone, a laptop computer, or a tablet computer. In some embodiments, the external computer is located at a different geographic location than the interface.

Detection Zone: is an X/Y plane, associated with the floating image, that an operation of indication crosses (e.g., a finger) and where the corresponding X/Y coordinates are sensed by the touch sensor such that the "touch" can be used as a user input, e.g., to select an interface selection displayed on the floating image.

Display: as used herein is a broad term and refers to any light-emitting display where the emitted light can be used to generate a floating image. The "display" can refer to a display panel of a computing device, for example, a tablet computer, a laptop computer, a watch, a phone or other mobile device, or another display panel that can render an image. A display typically is planar and provides light in a two-dimensional format, for example, as a still image of a series of images (e.g., video) that can be perceived by a user. In the illustrative examples described herein, a display is a component of the image system. Different type of display technologies can include liquid crystal displays (LCD), light emitting diodes (LED), organic light emitting diodes (OLED), plasma displays, field emission displays, electronic paper, cathode ray tube (CRT), digital light processing (DLP), and the like.

Floating Image: an image that is generated by the image system that appears to be floating, for example, in front of or above a surface, and that includes portions (e.g., similar to buttons on a touch interface) that are indicative of a possible selection by a user.

Gesture: a predetermined movement, or set of movements, made by a user that is interpreted that is intended to be interpreted as a user input indicating an action to occur. Typically, gestures are made with a hand, but gestures can be made with other body parts, for example, a user's leg, foot, arm, head, and the like.

Image System: as used herein, an image system is a broad term that refers to a system that generates a two-dimensional (2D) or three-dimensional (3D) floating image. The contactless interface includes an image system. The image system can include a display and an optical device. The image system can also include one or more other components, including for example one or more assemblies to move the display (e.g., rotate the display around an axis and/or move the display in one or more of an x, y, z-direction), and/or to move the optical device (e.g., rotate the optical device around an axis and/or move the optical device in one or more of an x, y, z-direction). In an embodiment, the image system receives a control signal to generate the floating image when a user is within a certain (e.g., predetermined) proximity of the interface, e.g., based on information sensed by the user sensor.

Optical device: a component of the image system that receives light from a display and provides light in a manner that is perceived by a user to be a "floating image." In one example, an optical device is an optical array. In some examples, the optical array is a transmissive dihedral corner reflector array, a transmissive mirror device, and the like.

Positional Assembly: as used herein, a positional assembly is a broad term that refers to a single device or mechanism, or more than one device or mechanism, which is used to move the contactless interface, the image system, and/or components of the image system, which affects the position of the generated floating image. In some embodiments, the positional assembly is coupled to the image system and moves the contactless interface as a whole, or the image system, around an axis or moves the image system in one or more of an x, y, z-direction. In some embodiments, the positional assembly is coupled to the display and configured to move the display (e.g., rotate the display around an axis or move the display in one or more of an x, y, z-direction), and/or to move the optical device (e.g., rotate the optical device around an axis and/or move the optical device in one or more of an x, y, z-direction). In some embodiments, the positional assembly moves components it is coupled to based on information from the user sensor (e.g., sensing proximity of the user, a distance to the user, the user's height, eyes, or line-of-sight). In some embodiments, a positional assembly is configured to move the touch sensor in corresponding to a position that the floating image is generated, to form a detection zone near the floating image. In some embodiments, a positional assembly is configured to move the user sensor in corresponding to a position for better detection of user characteristics, based on for example, the position of the floating image and/or a detected position of a user.

User Sensor (first sensor assembly): a sensor that is configured to determine one or more physical characteristics that are associated with a user. The physical characteristic can be for example, the presence of a user (e.g., if a user is near/within a certain distance of the user sensor), user face detection, a height of the user, the position of the user's eyes, a position of the user relative to the contactless interface apparatus, a distance of the user relative to the contactless interface apparatus, the line-of-sight of the user, one or more hand gestures of the user that are not interactions with the floating image, and the like. The user sensor can include one or more of various user technologies, including but not limited to infrared (IR), ultrasonic, vertical-cavity surface-emitting laser (VCSEL), light detection and ranging (LIDAR), one or more cameras, etc. In some embodiments, the user sensor functionality can be performed by the same sensor assembly as the touch sensor such that the first sensor assembly is also the second sensor assembly. For example, by using a camera, webcam and the like as the first sensor assembly and the second sensor assembly.

The following is a list of certain annotations and components that are described and enumerated in this disclosure in reference to the above-listed figures. However, any aspect, structure, feature or operational function of the devices illustrated in the figures, whether or not named out separately herein, can form a portion of various embodiments of the invention and may provide basis for one or more claim limitation relating to such aspects, with or without additional description. The annotations and enumerated components include:

1—contactless interface apparatus ("contactless interface" or "interface")
2—housing
3—detection of user's height
4—detection of user's eye(s) position
5—detection of user's proximity (e.g., distance away from interface apparatus)
6—horizontal surface of an object that contactless interface is positioned on or within
7—vertical surface of an object that the contactless interface is positioned on or within
8—axis of rotation of floating image
9—axis of rotation of display
10—image system
11—display or light-emitting device ("means of illumination")
12—actuation sensor (touch sensor or second sensor assembly) ("actuation detection means")
13—optical device (e.g., optical array)
14—floating image
15—emitted signal (e.g., IR) from touch sensor
16—example application
17—operation of indication (selection of a portion of the floating image)
18—in air contact
19—emitted light from display
20—light propagated from optical device (e.g., reflected light)
21—angle of reflection
22—equidistant or near equidistant
23—X/Y coordinate pair
24—angular alignment of the display and optical device
25—user's eye(s)
26—user's head
27—user sensor ($1^{st}$ sensor assembly) ("user detection means")
28—user's line-of-sight
29—mechanical arm and/or other means to rotate touch sensor module
30—mechanical arm and/or other means to rotate floating-image device
31—user's line-of-sight relative to the floating image
32—computer (e.g., external computer or mobile device with a display)
33—external microphone
34—external speakers
35—body part (e.g., arm, head, leg, torso, etc.)
36—optional strap or method to keep the apparatus attached to said body part
37—selectable portion(s) of floating images
39—interface
42—positional assembly
45—distal side of floating image (distal to the optical device)
47—proximal side of floating image (proximal to the optical device)
49—$1^{st}$ surface of optical device
50—controller
51—$2^{nd}$ surface of optical device
53—signal from user sensor
54—axis of rotation of display
55—detection zone
57—reflective surface(s)
58—plane of optical device
60—orthogonal vector
62—acute angle vector
64—obtuse angle vector
66—camera controls
68—image/camera registration
69—computer port
70—touch detection
72—output
74—device (e.g., external computing device)
75—opening
76—field of view
78—field of view
80—longitudinal axis around which contactless interface rotates
81—rotation around longitudinal axis
82—positional assembly that rotates contactless interface
84—halfway point in the optical device
87—axis
88—halfway point line
89—point on the top edge of the display
90—point of intersection from halfway point line and edge of display line
91—halfway point line
92—display intersect line
93—edge of display line
94—first sensor alignment point
95—second sensor alignment point
96—sensor line
97—point inside housing; sensor setup point
200—computer (e.g., controller)
202—bus
204—processor(s)
206—main memory
208—ROM
210—storage device
212—display
214—input device 216—cursor control
218—communication interface
220—network links
224—host(s)
230—server(s)
250—look-up table(s)
300—rotary actuator or linear actuator
302—center rotation point
303—rotate left
304—rotate right
308—degree halfway point
310—total degrees
312—min degree
314—max degree
320—calibration step(s)
400—camera coordinates
401—y-axis (camera coordinates; X)
402—x-axis (camera coordinates; Y)
403—z-axis (camera coordinates; Z)
405—center of camera
410—image plane
411—y-axis (image plane)
412—x-axis (image plane)
413—point p (projection of the 3D point P on the image plane)
414—point c (on the image plane)
420—world coordinates
421—z-axis (world coordinates; W)
422—x-axis (world coordinates; U)
423—y-axis (world coordinates; V)
425—point P (3D point in world coordinates)
430—rotation and translation of world coordinates respective to camera coordinates (R, t)
500—facial orientation plane
502—camera center focal line
504—virtual image orientation plane
506—camera center focal point
510—plane 1 (P1)
512—plane 2 (P2)
514—angle between plane 1 and plane 2
520—left eye outer corner
521—right eye outer corner
523—tip of nose
525—outer left corner of mouth
527—outer right corner of mouth
529—chin
600—first ultrasonic sensor
601—second ultrasonic sensor
603—distance between the first and second ultrasonic sensors (side C)
604—c1 ($1^{st}$ part of side C)
605—c2 ($2^{nd}$ part of side C)
607—height
609—distance between ultrasonic sensor 1 and user (side A)
610—distance between ultrasonic sensor 2 and user (side B)
612—detected user's x/y coordinates FIG. 1 is an example of a contactless interface apparatus ("interface") 1 configured to provide a touchless interface, the touchless interface including a floating image 14, according to some embodiments. In this example, interface 1 includes a housing 2 that at least partially encloses at least some of the components of the interface 1. In some embodiments, the interface is incorporated into a vertical structure (e.g., a wall) or a non-vertical/horizontal structure (e.g., an appliance, elevator, etc.) and such structures can form all or a portion of the housing.

The interface 1 includes a first sensor assembly ("user sensor") 27 configured to sense the presence of and/or a characteristic of a user, and a second sensor assembly 12 ("actuation" or "touch" sensor) configured to sense an interaction with the floating image 14. The touch sensor 12 is configured to sense an intrusion in a "detection zone" near the floating image and generally in a plane parallel to the floating image 14. The detection zone can be defined at least in part by the touch sensor 12 characteristics. The user sensor 27 and the touch sensor 12 can be coupled to the housing 2. In some embodiments, one or both of the user sensor 27 and the touch sensor 12 are coupled to other structures, and communicate with a controller 50 (FIG. 2) of the interface 1.

An interaction of a user with the floating image 14 can be referred to as an "in air contact." The floating image 14 can depict one selectable portions 37 that are similar to actuation areas ("buttons") that appear on a graphical user interface (GUI) on a display. For example, as illustrated on the floating image 14 in FIG. 1, Selection #1, Selection #2, Selection #3, Selection #4, Selection #5, Selection #6, and Enter. Using sensed information from the user sensor 27 and the touch sensor 12, the interface 1 can determine a user input that is made on the floating image, and convey an input signal indicative of the selection made by the user input. In an example, the interface 1 can convey an input signal to a computing device in communication with the interface 1, such that the interface 1 essentially operates as input device to the computing device (e.g., similar to a mouse or other pointing device providing a signal indicative of a selection on a GUI).

In this example, the interface 1 is positioned horizontally and the floating image 14 extends vertically above a portion of a display at an angle from an optical surface 39 of the interface 1. Light that forms the floating image 14 is generated by a display 11 (e.g., FIG. 2) that propagates from/through the optical surface 39 in a way to have a focal point at the floating image 14, such that the user perceives the floating image 14 as being physically apart from the interface 1, for example, apart from the optical surface 39 instead of appearing to be on the optical surface 39.

Figure 2A:
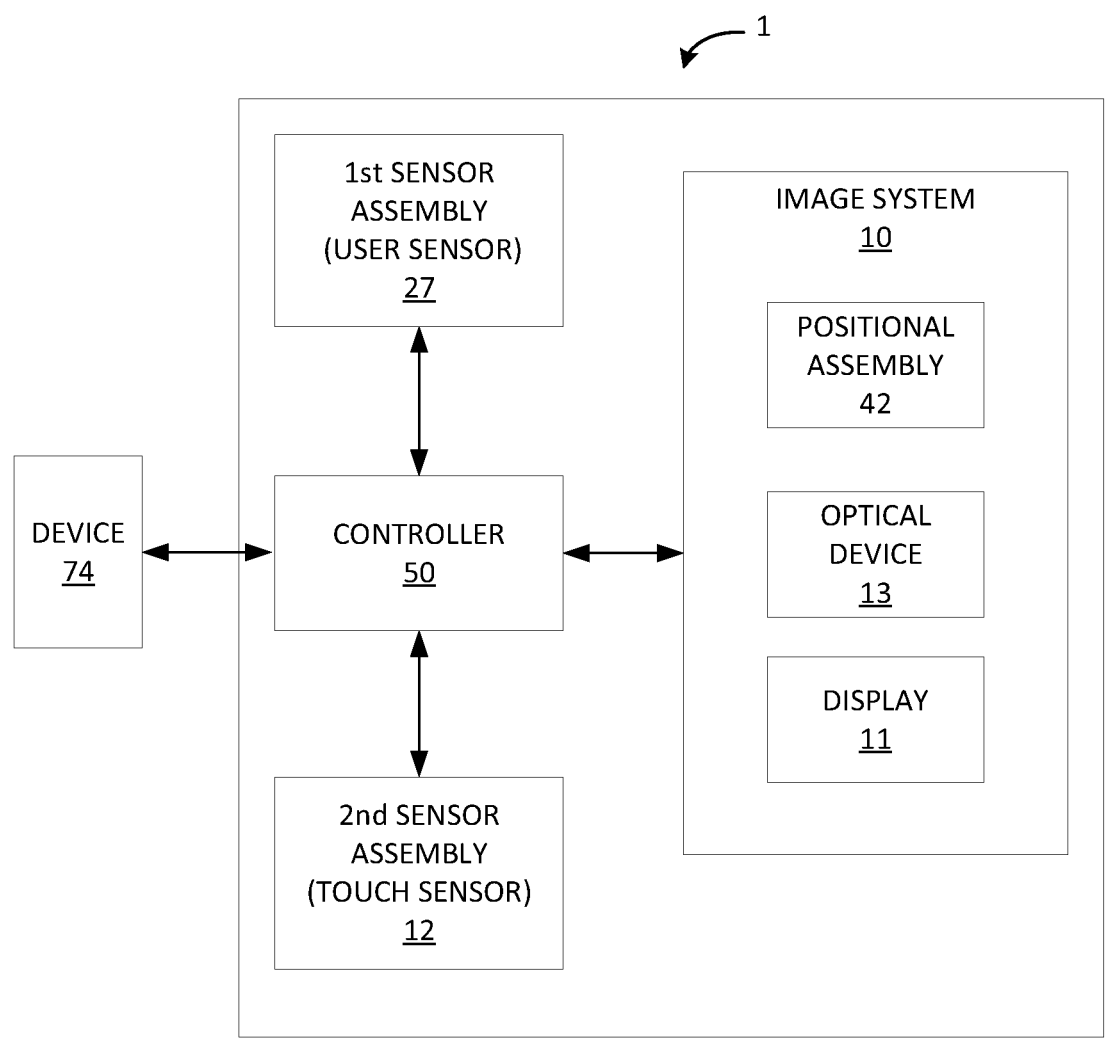
FIG. 2A is a block diagram illustrating an example of certain components of the contactless interface.
Figure 2B:
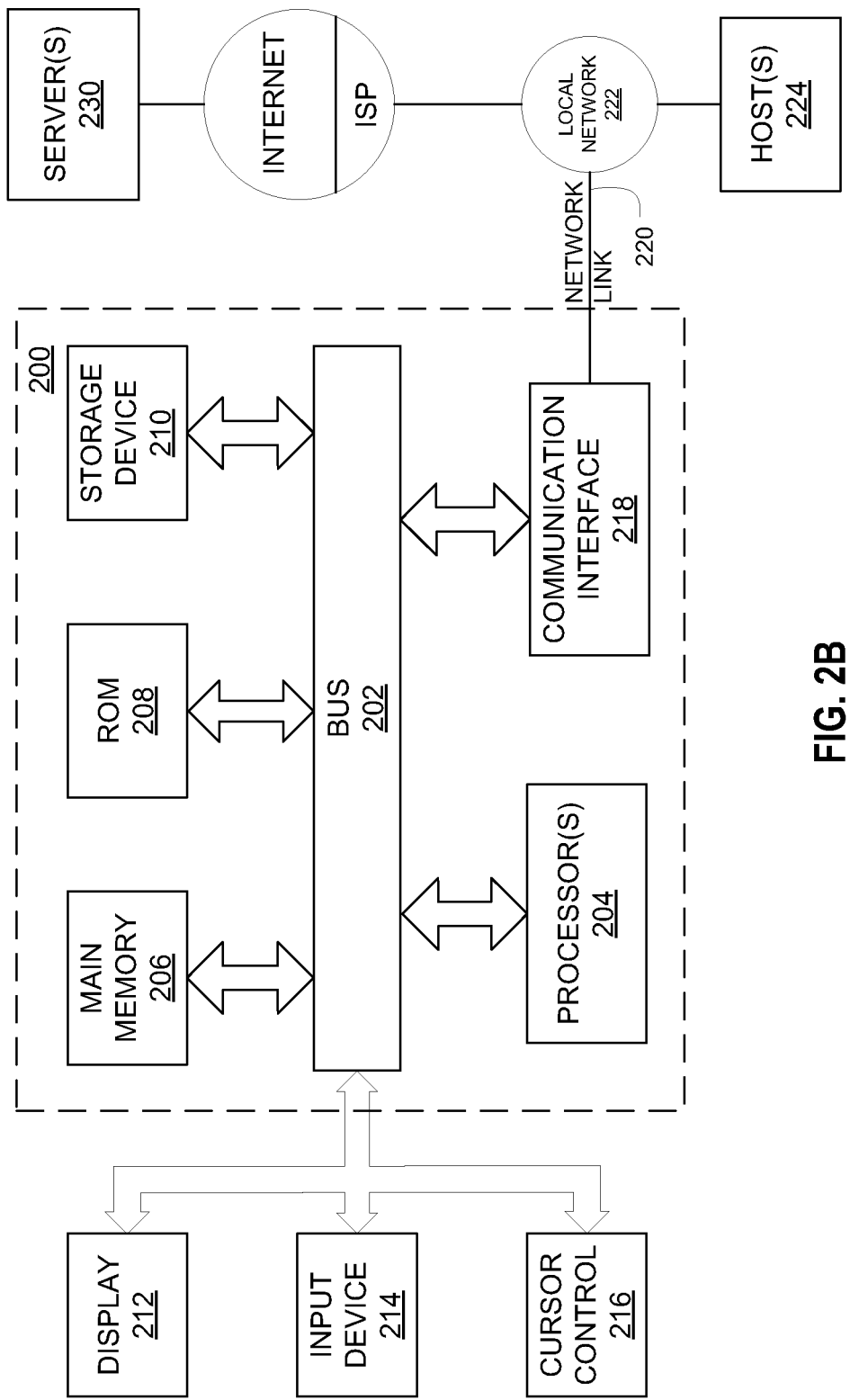
FIG. 2B is a block diagram illustrating an example of a computer system that can be used to perform the functionality described herein, for example, the functionality of the controller.

FIG. 2A is a block diagram illustrating an example of certain components of the interface 1, according to various implementations. As shown in FIG. 2, the interface 1 includes a controller 50 which includes at least one hardware processor. In an example, the controller 50 includes at least some of the components of the computer system 200 (FIG. 2B). The interface 1 also includes the first sensor assembly (user sensor) 27 the second sensor assembly (touch sensor) 12.

The interface 1 also includes image system 10 which is configured to generate the floating image 14. Image system 10 includes a display 11 and an optical device 13 which is positioned to receive light emitted from the display 1. In various embodiments, optical device 13 and/or the display 11 can be coupled to the positional assembly 42, which is configured to adjust the alignment/position of the display 11 and/or the optical device 13 to generate the floating image in different positions. For example, at a different angle with respect to the top surface 37 (FIG. 1), or in a different position relative to the top surface 37. In some embodiments, the positional assembly 42 can be configured to move the entire image system 10 to change the location of the floating image 14. For example, the positional assembly 42 may rotate the image system 10 around an axis (e.g., a vertical axis, a horizontal axis, or an axis aligned in between the vertical axis and the horizontal axis) to change the position of the floating image 14 Examples of the positional assembly 42 and its movement of the display 11 and the optical device 13 are described in reference to in FIGS. 6, 7, 8, and 10.

The controller 50 is in communication with the $1^{st}$ sensor assembly (user sensor) 27 and the $2^{nd}$ sensors assembly (touch sensor) 12, and processes information received from the sensor assemblies 27, 12 to control the interface 1. For example, the controller 50 can receive information from the user sensor 27 indicating the presence of a user and activate the display 11 to generate the floating image 14. In another example, the controller 50 can receive information from the user sensor 27 indicating the height, eye position, and/or a distance to the user, and the controller 50 can control the positional assembly 42 to move one or more of the display 11 and the optical device 13 to position the floating image at an angle or a location that may be best perceived by the user. Sensing physical characteristic of the user, including the sensing presence of user in the proximity of the interface 1 is further described in reference to FIGS. 4, 5, and 10. The controller 50 can provide an output to a device 74 based on information from the touch sensor 12 indicative of the input of a user (e.g., the selection of an item depicted on the floating image 14).

FIG. 2B is a block diagram illustrating an example of a computer system 200 that can be used to perform the functionality described herein of a contactless interface. For example, in various examples, the components of a controller 50. Computer system 200 includes a bus 202 or other communication mechanism for communicating information, and a hardware processor, or multiple processors, 204 coupled with bus 202 for processing information. Hardware processor(s) 204 may be, for example, one or more general purpose microprocessors.

Computer system 200 also includes a main memory 206, such as a random access memory (RAM), cache and/or other dynamic storage devices, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render and computer system 200 into a special-purpose machine that is customized to perform the operations specified in the instructions. The main memory 206 may, for example, include instructions to implement positioning of the display 11, the optical device 13, and/or the entire image system 10 to provide floating image in a position that may be best perceived by a user.

Computer system 200 can further include a read only memory (ROM) 208 or other static storage device coupled to bus 202 for storing static information and instructions for processor 204. A storage device 210, such as a magnetic disk, optical disk, or USB thumb drive (Flash drive), etc., can be provided and coupled to bus 202 for storing information and instructions.

In some embodiments, computer system 200 may be coupled via bus 202 to a display 212, such as a cathode ray tube (CRT), LED, or LCD display (or touch screen), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212.

Computing system 200 may include a user interface module to implement a GUI that may be stored in a mass storage device as computer executable program instructions that are executed by the computing device(s). Computer system 200 may further, as described below, implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor(s) 204 executing one or more sequences of one or more computer readable program instructions contained in main memory 206. Such instructions may be read into main memory 206 from another storage medium, such as storage device 210. Execution of the sequences of instructions contained in main memory 206 causes processor(s) 204 to perform the process steps described herein. In alternative embodiments, hard-wired circuitry may be used in place of or in combination with software instructions.

Various forms of computer readable storage media may be involved in carrying one or more sequences of one or more computer readable program instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

In some embodiments, computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN (or WAN component to communicate with a WAN). Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world-wide packet data communication network now commonly referred to as the "Internet" 228. Local network 222 and Internet 228 both use electrical, electromagnetic or optical signals that carry digital data streams.

The signals through the various networks and the signals on network link 220 and through communication interface 218, which carry the digital data to and from computer system 200, are example forms of transmission media.

In some embodiments, computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and/or stored in storage device 210, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

FIG. 2C is a block diagram illustrating an example of a controller 50 receiving user information from a user sensor 27 at a processor 204 via a communication interface 218. The processor 204 can be configured to determine positional information of where to generate the floating image from the user information. In some examples, the processor 204 accesses stored predetermined data (e.g., stored in look-up tables or other data storage structures) in a memory component (e.g., main memory 204 or ROM 208). For example, the look-up table can store a range of positional information relating to the user heights. In another example, the lookup table can store a range of positional information relating to the height of the user's eyes. In another example the lookup table can store a range of positional information relating to the distance from of the user to the interface. In another example, the lookup table can store a range of positional information relating to one or more user information that is sensed by the user sensor 27. Then, the controller 50 can provide positional information to the image system 10, and the positional information can be used by the image system 10 to generate the floating image in a certain location. In some embodiments, positional information is used by positional assembly in the image system 10 to move the display and/or the optical device based on the positional information. In some embodiments, controller provides positional information to positional assembly that moves the whole image system (e.g., the optical device and the display) or moves the entire contactless interface based on the position information.

Figure 3A:
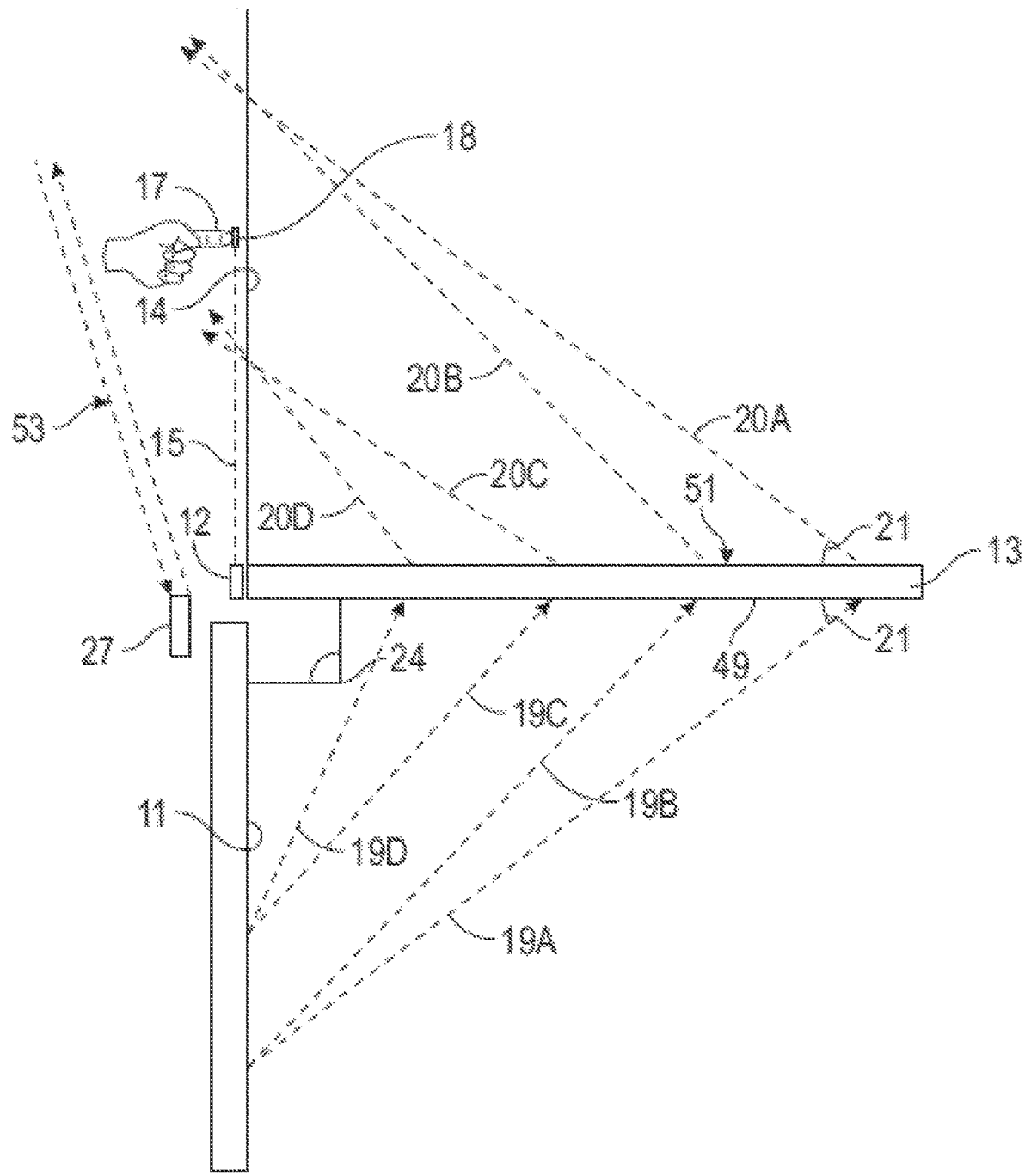
FIG. 3A illustrates an example of a contactless interface having a display and an optical device aligned to generate a floating image at a certain position based on sensed information relating to a user sensed by a first sensor assembly, and also sensing an interaction with the floating image by a second sensor assembly. example of components of an apparatus positioned to create a contactless interface, viewed from the side of the apparatus, according to various embodiments of the invention.

FIG. 3A illustrates an example of a side view of a configuration of components of a contactless interface. The interface includes display 11 and optical device 13, where a planar surface of the display 11 is positioned at an angle 24 relative to a planar surface of the optical device 13. The display 11 emits light 19 that is received by first surface 49 of the optical device 13. A second surface 51 of the optical device emits light 20 in a direction generally towards where a user of the interface will be, and the emitted light 20 forms the floating image 14. For example, light beams 19A and 19B are emitted from a point on the display 11, are received by different portions of optical device 13, and are reflected as light beams 20A and 20B such that they intersect at a point forming a portion the floating image 14. In this embodiment, the light 19 impinges on the optical device 13 at an angle 21 and light 20 propagates from the optical device at the same angle 21. In some embodiments, the angle that light impinges on the optical device 13 is different than the angle that light propagates away from the optical device 13. For example, the optical device 13 may be a DCA having reflective surfaces which are angled to cause the light to be received at a first angle and propagate away from the optical device 13 at a different angle.

The touch sensor 12 is positioned such that a signal 15 is emitted from touch sensor 12 and travels along a path generally parallel to the floating image 14. When a user performs an in air indication 17 by making and in air contact 18 at a certain point on (or near) the floating image 18, a portion of the signal 15 is reflected back to the touch sensor 12, providing information on where the air indication was made, and this can be correlated to a portion of the floating image 14 to determine a selection on the floating image 14. The user sensor 27 is positioned such that it can provide a signal 53 to sense user information, which is communicated to the controller and can be used to control the positional assembly to generate the floating image 14 in a particular location, as described below in reference to FIGS. 5-8 and 10. In various embodiments, the user sensor 12 can sense information relating the user's eyes. For example, information that can be used to determine the location of the user's eyes or the user's line of sight. In some embodiments, the user sensor 12 includes a camera, and the controller includes image processing software that includes feature detection such that it can determine a position of the user's eyes, hand gestures made by the user, and the like, and provide control information positional assembly to control the position where the floating image 14 is generated, such that floating image 14 is generated based on the position of the user's eyes or based on one or more hand gestures of the user.

Figure 3B:
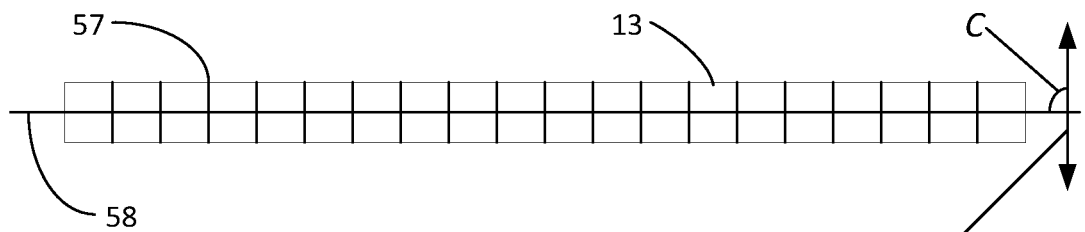
FIG. 3B illustrates an example of an embodiment of an optical device 13.

FIG. 3B illustrates an example of an embodiment of an optical device 13 generally positioned in a plane 58. The optical device 13 includes a series of reflective surfaces 57 that are aligned in-line with a vector 60 at an angle C with respect to the plane 58. In this embodiment, the reflective surfaces 57 are aligned orthogonal, or substantially orthogonal (90 degrees plus or minus 5 degrees), to the plan 58. In various embodiments the optical device 13 can include one of more other reflective surfaces (e.g, when the optical device 13 is a dihedral corner array.

Figure 3C:
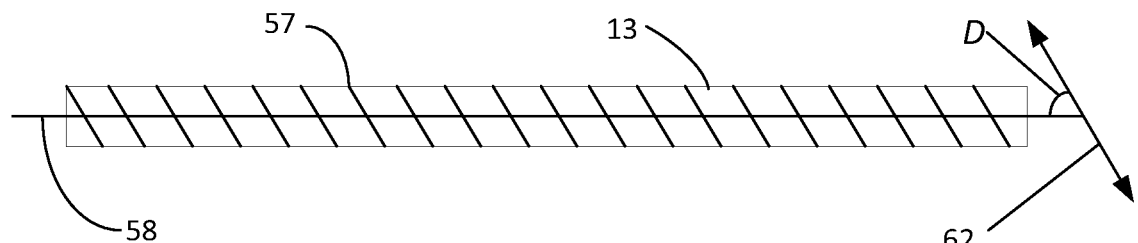
FIG. 3C illustrates another embodiment of an optical device 13.

FIG. 3C illustrates another example of an embodiment of an optical device 13 generally positioned in a plane 58. The optical device 13 includes a series of reflective surfaces 57 that are aligned in-line with vector 62 in an orientation 62 at an angle D with respect to the plane 58. In this embodiment, the angle D is greater than 0 degrees and less than 90 degrees. For example, angle D can be 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 89.5 degrees, plus or minus 0.5 degrees. In various embodiments the optical device 13 can include one of more other reflective surfaces (e.g, when the optical device 13 is a dihedral corner array.

Figure 3D:
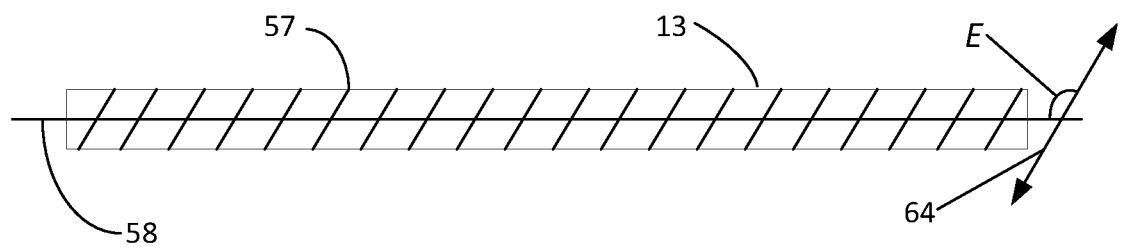
FIG. 3D illustrates another embodiment of an optical device 13.

FIG. 3D illustrates an example of an embodiment of an optical device 13 generally positioned in a plane 58. The optical device 13 includes a series of reflective surfaces 57 that are aligned in-line with a vector 64 at an angle E with respect to the plane 58. In this embodiment, the reflective surfaces 57 are aligned orthogonal, or substantially orthogonal, the plane 58. In this embodiment, the angle E is greater than 90 degrees and less than 180 degrees. For example angle D can be 90.5, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or 179.5 degrees, plus or minus 0.5 degrees. In various embodiments the optical device 13 can include one of more other reflective surfaces (e.g, when the optical device 13 is a dihedral corner array.

Figure 4:
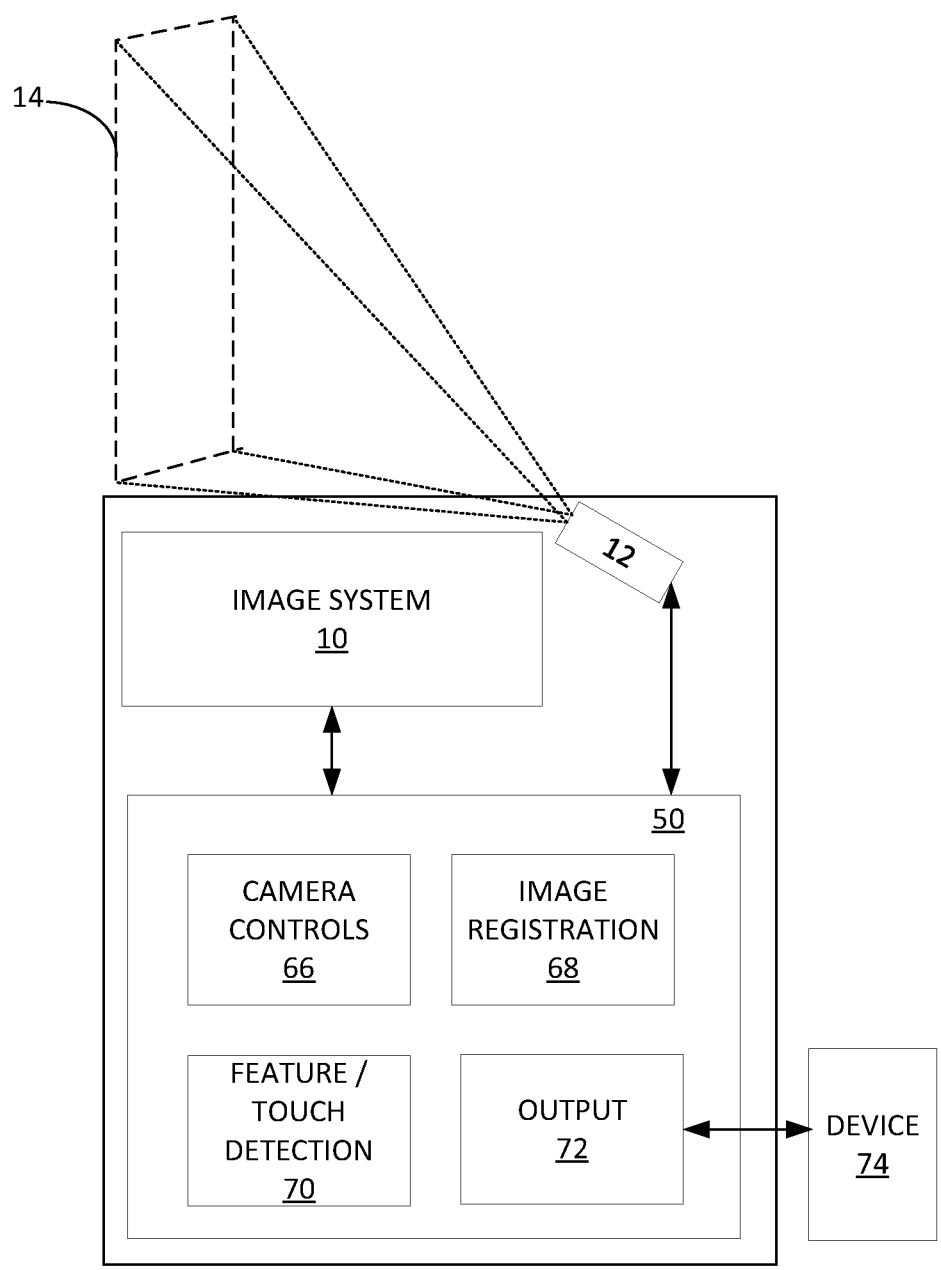
FIG. 4 illustrates an example of an embodiment of user sensor, where the user sensor comprises at least one optical image sensor (e.g., a camera).

FIG. 4 illustrates an example of an embodiment of touch sensor 12 in a contactless interface, where the user sensor 12 includes at least one optical image sensor (e.g., a camera). In an example, the user sensor 12 can generate a series of images (e.g., video data) that is sent to the controller 50 for processing. The images can be of a resolution suitable to discern the user's indications on the floating image 14. For example, lower resolution images when their selection portions are larger, and higher resolution when there are smaller, more numerous selections depicted in the floating image 14. The controller 50 can be configured to have camera controls 66 that are used to operate the touch sensor ("camera") 12. In an example, the controller 50 communicates to the camera 12 to control the resolution of images generated by the camera 12.

The controller 50 can also be configured with image registration functionality to align or register the image generated by the camera to the floating image 14 such that the controller 50 can determine what part of the floating image was touched when an air contact occurs. The controller 50 can also include feature/touch detection functionality 70 to determine when an air contact occurs. For example, to detect the presence of a user's finger in a certain portion of the floating image 14. The controller 50 can also include output functionality 72 to provide an output indicative of the portion of the floating image that was touched to another device 74 (e.g., a computing device).

Figure 5A:
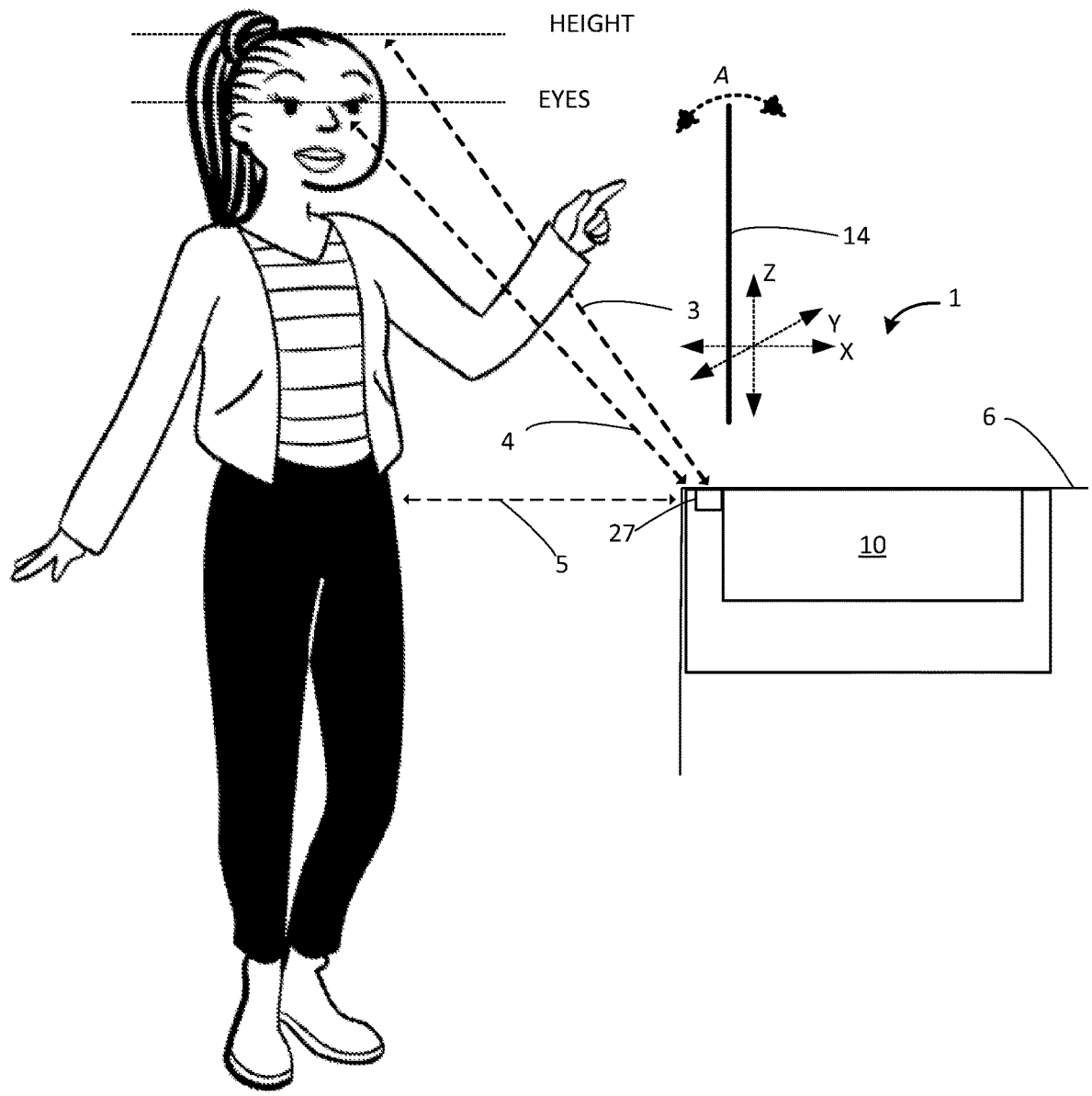
FIG. 5A illustrates an example of a touchless interface apparatus that is configured to provide a floating image interface at a position based on either user input or based on sensed information related to a user (e.g., a physical characteristic of the user), for example, the user's proximity, height, or the location of the user's eyes.

FIG. 5A illustrates an example of a contactless interface 1 that is configured to provide a floating image 14 at a position based on either user input or based on sensed information related to a user (e.g., a physical characteristic of the user), for example, the user's proximity, height, or the location of the user's eyes. In this embodiment, the interface 1 is illustrated as being incorporated in a horizontal surface 6 (e.g., table, counter, appliance, kiosk, etc.). The user sensor 27 is configured to detect information 4 relating to a position of the user's eyes, information 5 relating to the proximity of the user (e.g., a distance between the user and user sensor 27), and/or information 3 relating to another characteristic of the user, for example, the user's height, a position of the user's head, etc. The information sensed by the user sensor 27 is communicated to a controller, and based on his information, the controller can send control signals to the positional assembly to position the floating image 14 at various angles A or in various positions (for example, to move the floating image 14 in an x, y, or z-direction based on the user sensed information).

Figure 5B:
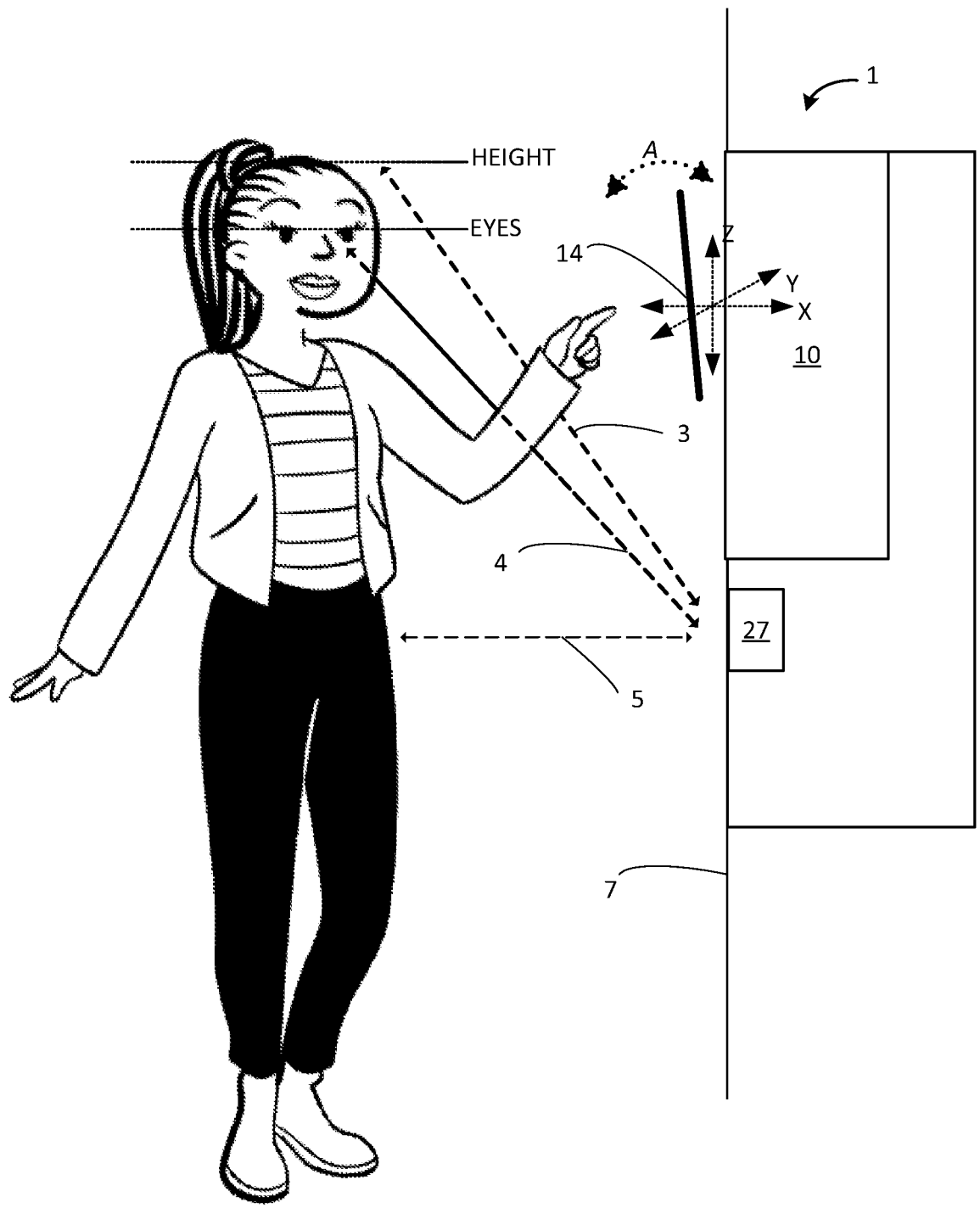
FIG. 5B illustrates another example of a touchless interface apparatus that is configured to provide a floating image interface at a position based on either user input or based on sensed information related to a user (e.g., a physical characteristic of the user), for example, the user's proximity, height, or the location of the user's eyes.

FIG. 5B illustrates another example of a touchless interface apparatus that is configured to provide a floating image interface at a position based on either user input or based on sensed information related to a user (e.g., a physical characteristic of the user), for example, the user's proximity, height, or the location of the user's eyes. In this embodiment, the interface 1 is illustrated as being incorporated in a vertical surface 6 (e.g., wall, a vertical surface of an elevator, an appliance, a kiosk, etc.). The user sensor 27 is configured to detect information 4 relating to a position of the user's eyes, information 5 relating to the proximity of the user (e.g., a distance between the user and user sensor 27), and/or information 3 relating to another characteristic of the user, for example, the user's height, a position of the user's head, etc. The information sensed by the user sensor 27 is communicated to a controller, and based on his information, the controller can send control signals to the positional assembly to position the floating image 14 at various angles A or in various positions (for example, to move the floating image 14 in an x, y, or z-direction based on the user sensed information).

The floating image can best be seen by a user when the user's eyes are at a certain position relative to the floating image. In various embodiments, the position of the floating image 14 can be changed so the user can better see the floating image. In some embodiments, a user can control a positional assembly to adjust the position of the floating image manually or with a hand gesture. In some embodiments, a user sensor senses information about a user (a hand gesture or a physical characteristic of the user), communicates the information to a controller, and the controller controls a positional assembly to change the position of the floating image. A positional assembly can change the position of the floating image by moving the entire image system, or one or more components of the image system. The positional assembly can also move the touch sensor correspondingly with the floating image so that a detection zone of the touch sensor is near the floating image and user selections on the floating image can be sensed.

Figure 6:
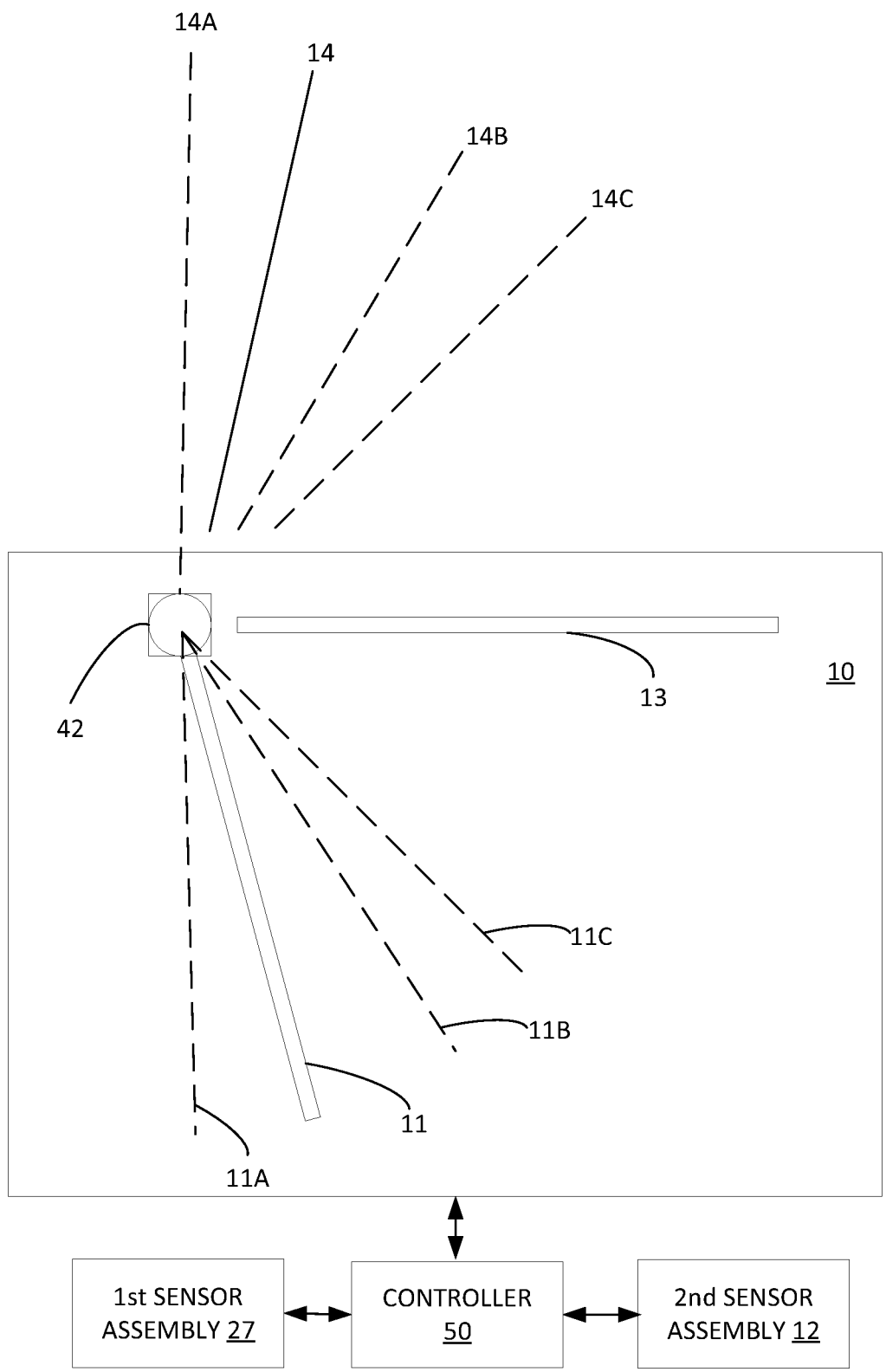
FIG. 6 illustrates an example of a positional assembly coupled to a display and configured to move the display (e.g., rotate the display or move the display in x, y, z-direction) based on sensed information related to a user.
Figure 7:
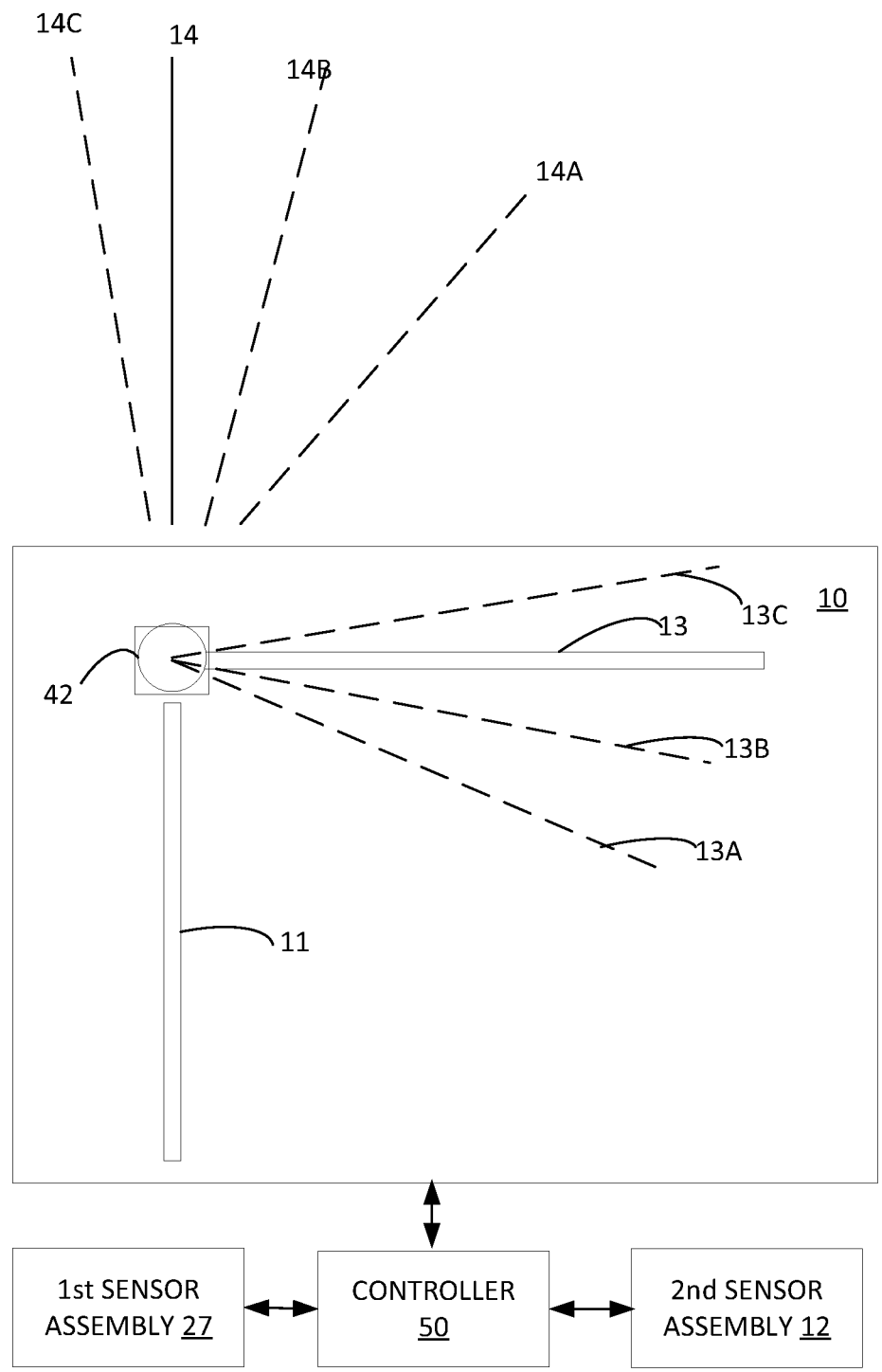
FIG. 7 illustrates an example of a positional assembly coupled to an optical device and configured to move the optical device (e.g., rotate the display or move the display in x, y, z-direction) based on sensed information related to a user.

FIG. 6 illustrates an example of a positional assembly 42 coupled to a display and configured to move the display (e.g., rotate the display or move the display in x, y, z-direction) based on sensed information related to a user, which corresponding moves the floating image 14. Moving the floating image 14 to a different position can make it easier for a user to see the floating image 14. In this embodiment, the positional assembly 42 is coupled to the display 11 and configured to rotate the display 11 around an axis, such that the display 11 can be moved to different positions 11A, 11B, 11C, each position being at a different angle relative to the optical device 13. When the display is located at different positions 11A, 11B, 11C, the floating image 14 is formed at corresponding positions 14A, 14B, 14C. In some embodiments, the positional assembly 42 is coupled to the optical device 13, as illustrated in FIG. 7. In other embodiments, the positional assembly 42 is coupled to 13 and the display 11.

FIG. 7 illustrates an example of a positional assembly coupled to an optical device and configured to move the optical device (e.g., rotate the display or move the display in x, y, and/or z-direction) based on sensed information related to a user, which corresponding moves the floating image 14 which can make it easier for a user to see the floating image 14. In this embodiment, the positional assembly 42 is coupled to the optical device 13 and configured to rotate the optical device 13 around an axis, such that the optical device 13 can be moved to different positions 13A, 13B, 13C, each position being at a different angle relative to the display 11. When the display is located at different positions 13A, 13B, 13C, the floating image 14 is formed at corresponding positions 14A, 14B, 14C.

Figure 8A:
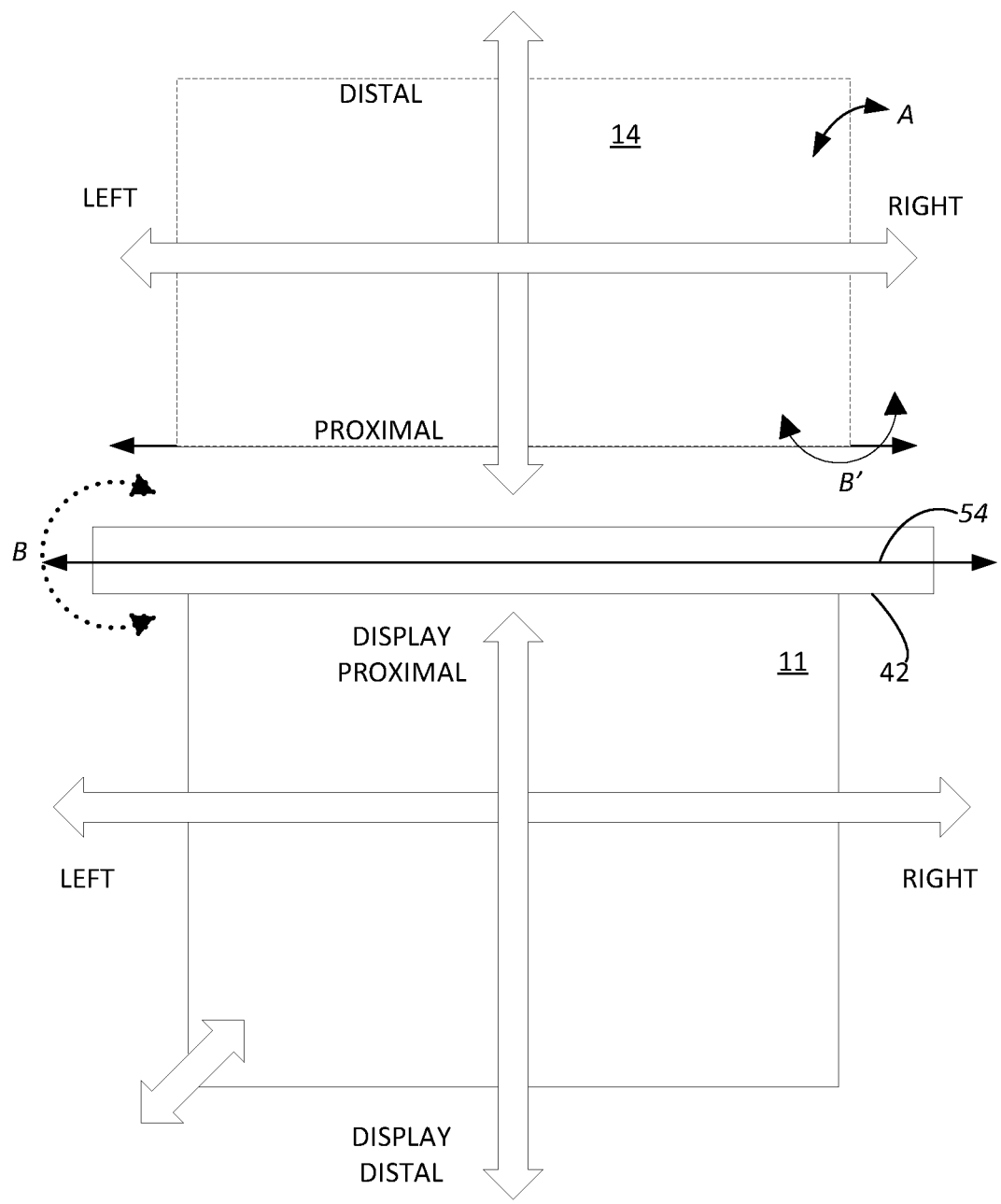
FIG. 8A illustrates another example of a positional assembly coupled to a display device and configured to move the display (e.g., rotate the display or move the display in x, y, z-direction) based on sensed information related to a user.

FIG. 8A illustrates another example of a positional assembly 42 coupled to a display 11 and configured to move the display (e.g., rotate the display or move the display in x, y, and/or z-direction) based on sensed information related to a user. The viewpoint of FIG. 8A is from a "front" aspect of the user interface, similar to the position of the user when facing the floating image 14. As mentioned above, the positional assembly can be coupled to one or both of the display 11 and the optical device 13, and rotate and/or move the display 11 and the optical device 13. Movement of the display 11 left or right (in reference to the aspect shown in FIG. 8A) can result in a corresponding movement of the floating image 14 left or right. Movement of the display 11 up or down (in reference to the aspect shown in FIG. 8A) can result in a corresponding movement of the floating image 14 up or down. Rotation B of the display 11 around an axis 54 can result in the rotation B' of the floating image 14 such that the distal portion of the floating image 14 moves to be located at an angle A (e.g., see example of side view in FIGS. 4 and 5).

In some of the embodiments herein, the display 11 is aligned at a 90° angle with respect to the display. In some embodiments, the display 11 can be rotated around an axis (e.g., axis 54) such that it is aligned at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 degrees, plus or minus 0.5 degrees with respect to the optical device 13. In some embodiments (e.g., as illustrated in FIG. 7), the optical device 13 can be rotated around an axis such that it is aligned at 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89 degrees, plus or minus 0.5 degrees, with respect to the display.

Figure 8B:
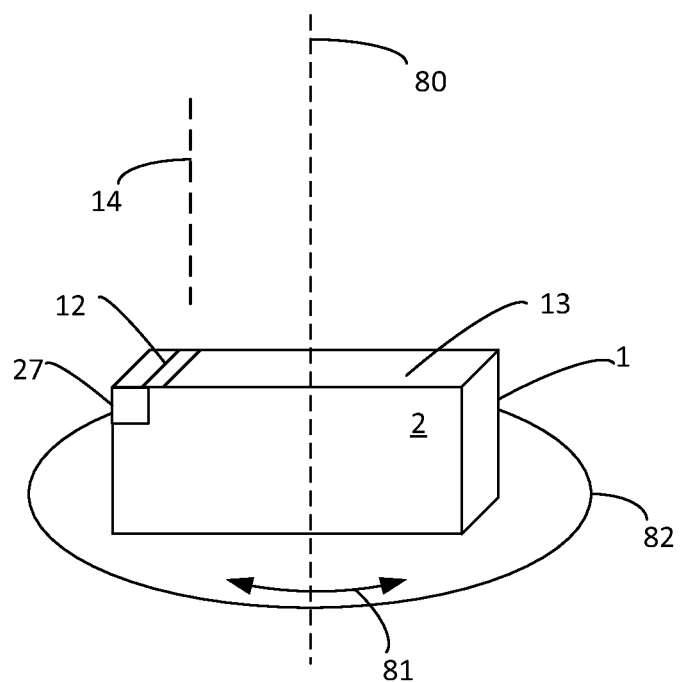
FIG. 8B illustrates an example of a positional assembly coupled to a contactless interface, where the entire contactless interface is movable (e.g., rotatable).

FIG. 8B illustrates an example of a positional assembly coupled to a contactless interface, where the entire contactless interface 1 is movable (e.g., rotatable). The contactless interface 1 illustrated in FIG. 8B includes a touch sensor 12, user sensor 27, an optical device 13, and a display (not shown) interior to a housing 2 of the contactless interface 1. In this embodiment, the contactless interface is coupled to a positional assembly 82 that is configured to rotate 81 around the longitudinal axis 80. For example, based on information sensed by the user sensor 27, the controller can control the positional assembly 82 to rotate around the longitudinal axis 80 to better position the contactless interface 1 so a user can see the floating image 14. In another example, a user can manually rotate the positional assembly 82 to adjust the position of the floating image 14 so the user can best see the floating image 14. Note this is one example of how the movement of the contactless interface, or a component of the contactless interface (e.g., the display or optical device) can be moved to change the position of the floating image. In some preferred examples, the angle of the display relative to the optical device is changed. The embodiment illustrated in FIG. 8B can also include a movable display or a movable optical device.

Figure 9:
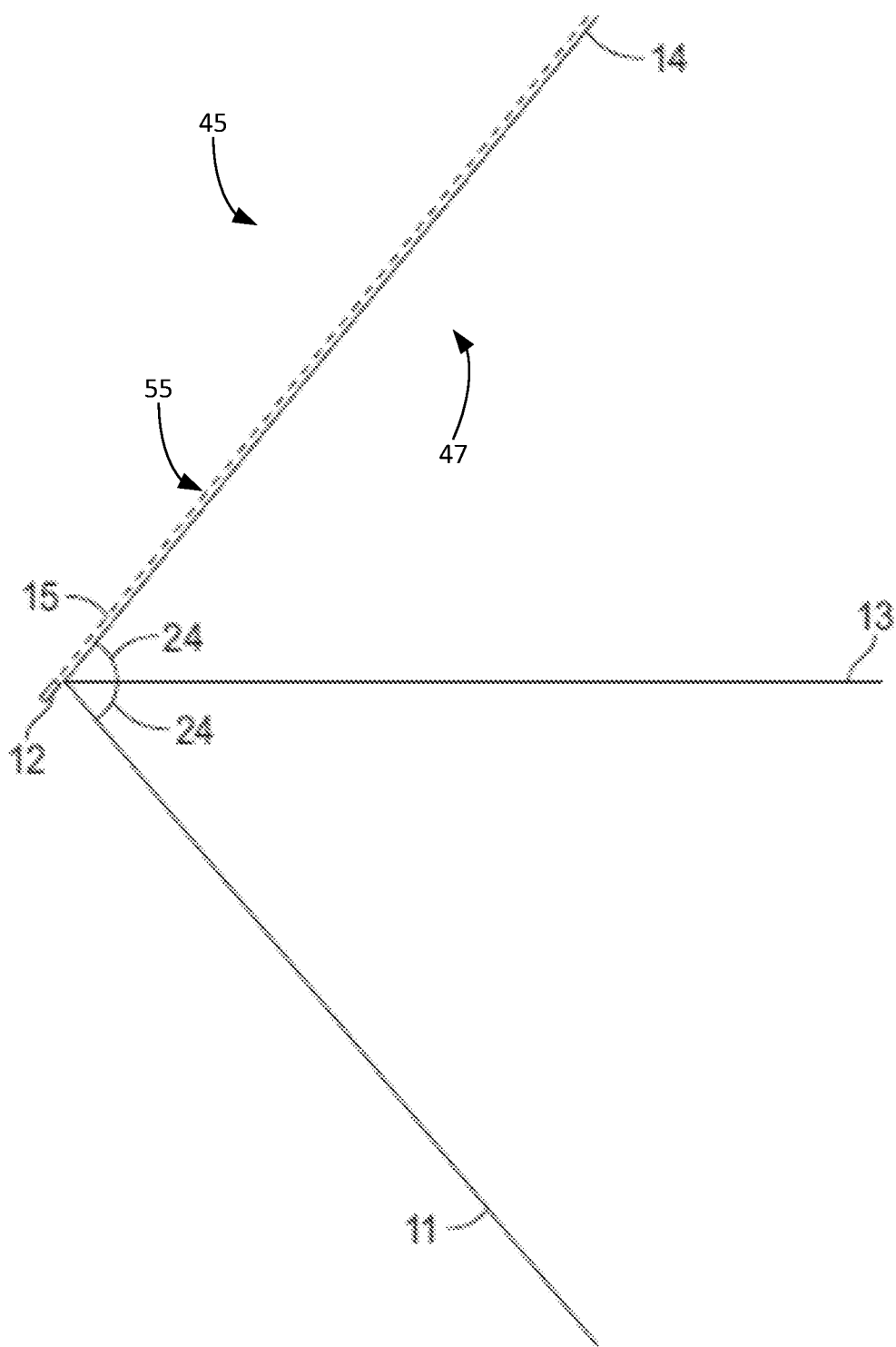
FIG. 9 illustrates an example of a floating image generated by a certain alignment of the display and the optical device, and a touch sensor aligned to detect create a detection zone on a distal side 45 of the floating image.

FIG. 9 illustrates an example of a floating image 14 generated by a certain angular alignment 24 of the display 11 and the optical device 13. In this example, the floating image 14 is aligned at an angle 24 relative to the optical device 13, which is the same angle that the display 11 is aligned with the optical device 13. The floating image includes a proximal side 47, closest to the optical device 13, and a distal side 45, closest to the position of a user of the contactless interface. A touch sensor 12 is aligned to provide a signal 15 in a detection zone along the distal side 45 of the floating image 14. to detect a detection zone on a distal side 45 of the floating image.

Figure 10:
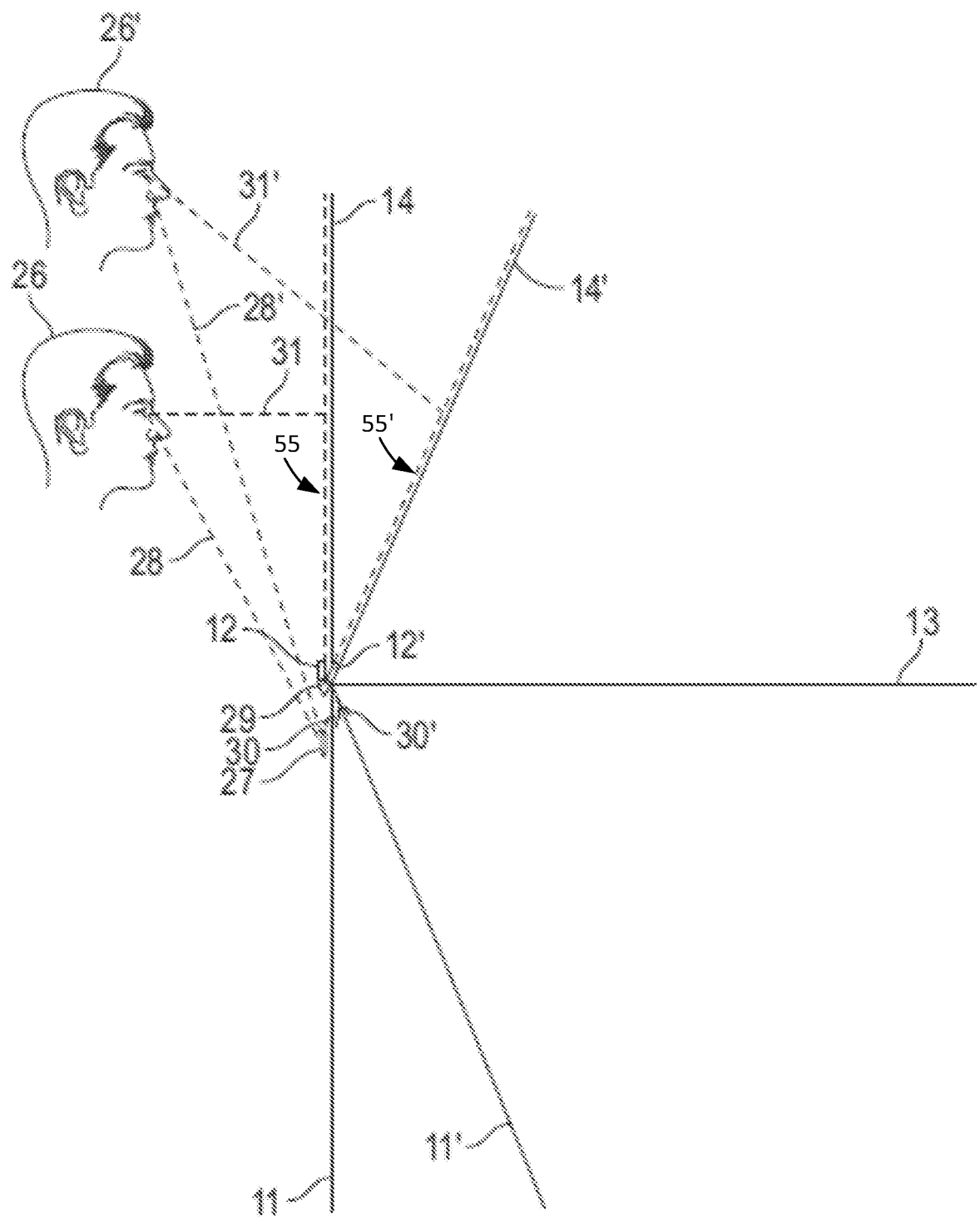
FIG. 10 illustrates an example of the contactless interface generating a floating image in two different positions based on sensed information of the user (e.g., the user's height, position of the user's eyes, the user's line-of-sight, etc.).

FIG. 10 illustrates an example of the contactless interface generating a floating image in two different positions based on sensed information of the user (e.g., the user's height, position of the user's eyes, the user's line-of-sight, etc.), and a corresponding movement of the touch sensor 12. For a user's head 26 at a first position, the user sensor 27 detects the position of the user 26 (e.g., the user's eyes or line of sight) and communicates the sensed information to a controller. The display 11 is aligned with the optical device 13 to generate a vertically aligned floating image 14 that the user 26 can see based on the user's line of sight 31. The touch sensor 12 is positioned to be aligned along the floating image 14 to detect an in air contact in the detection zone 55. For a user's head 26' at a second position, the user sensor 27 detects the position of the user 26' (e.g., the user's eyes or line of sight) and communicates the sensed information to a controller. Based on the sensed information, the controller controls a positional assembly (not shown) to rotate the display 11' to a position that allows the user to better see the floating image 14'. That is, the display 11' is aligned with the optical device 13 to generate a vertically aligned floating image 14' that the user 26' can best see based on the user's line of sight 31. The touch sensor 12' is coupled to a mechanical arm 30 which is configured to move the touch sensor 12' corresponding to the floating image 14' such that it is positioned to be aligned along the floating image 14' to detect an in air contact in the detection zone 55'.

Figure 11:
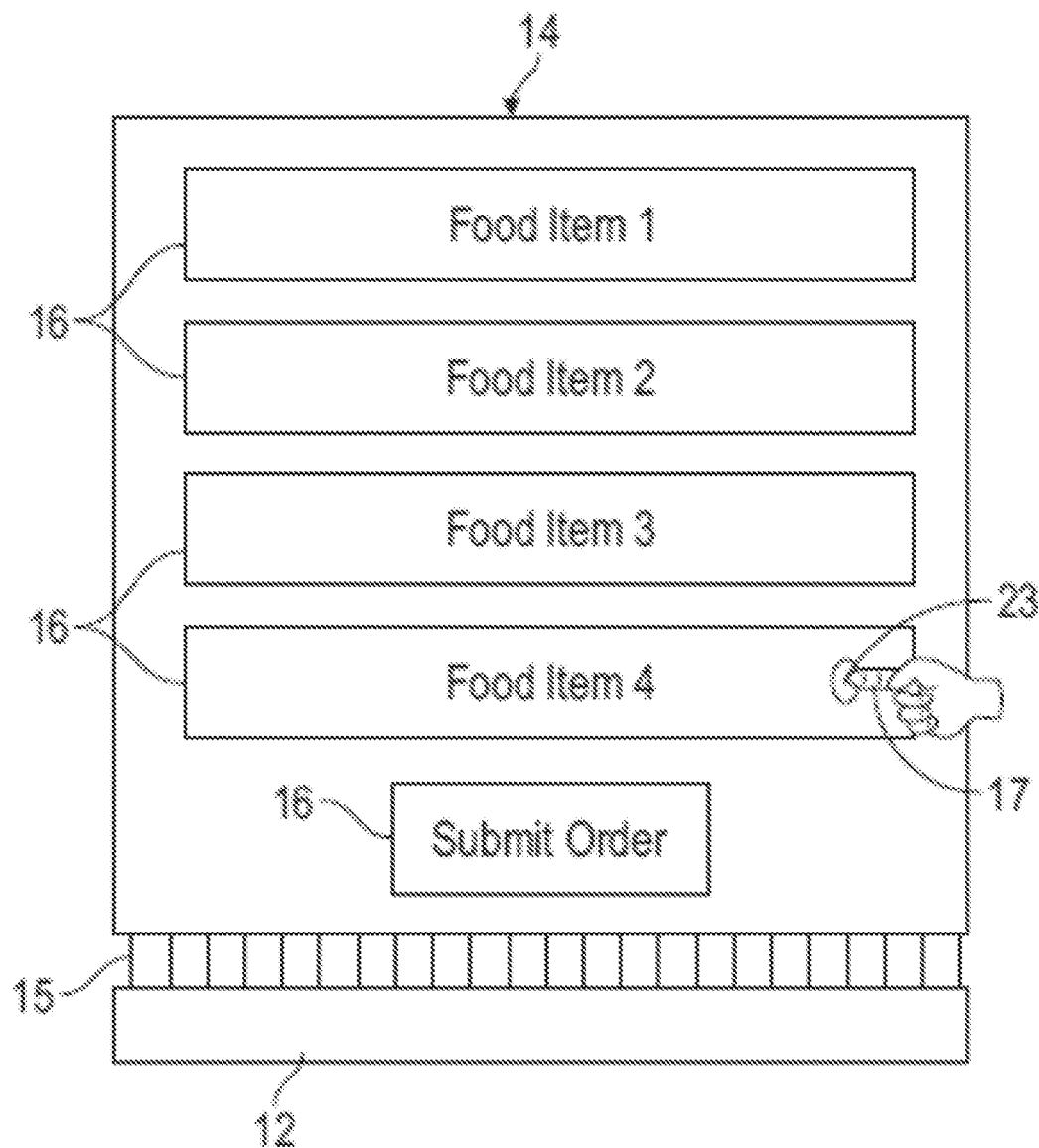
FIG. 11 illustrates an example of a floating image that includes portions that can be selected by a user and a touch sensor positioned and configured to detect the x/y position of the user's interaction with the floating image.

FIG. 11 illustrates an example of a floating image 14 that includes portions 16 that can be selected by a user, where the contactless interface is used as an input device to another system. In this example, the selectable portions 16 are related to food items (for example, on a fast-food ordering kiosk). In this embodiment, the touch sensor 12 is located near the bottom of the floating image 14 and emits a signal 15 along the floating image 14. When a user makes an operation of indication 17 selecting a portion of the floating image 14, the touch sensor 15 senses the indication and communicates information relating to the portion touched (e.g., information related to a x,y position of the floating image (or in some implementations, an x,y,z position of the floating image) to the controller 50 (FIG. 2). The controller 50 can provide information relating to the touch to a system that processes the input and generates a user order.

Figure 12:
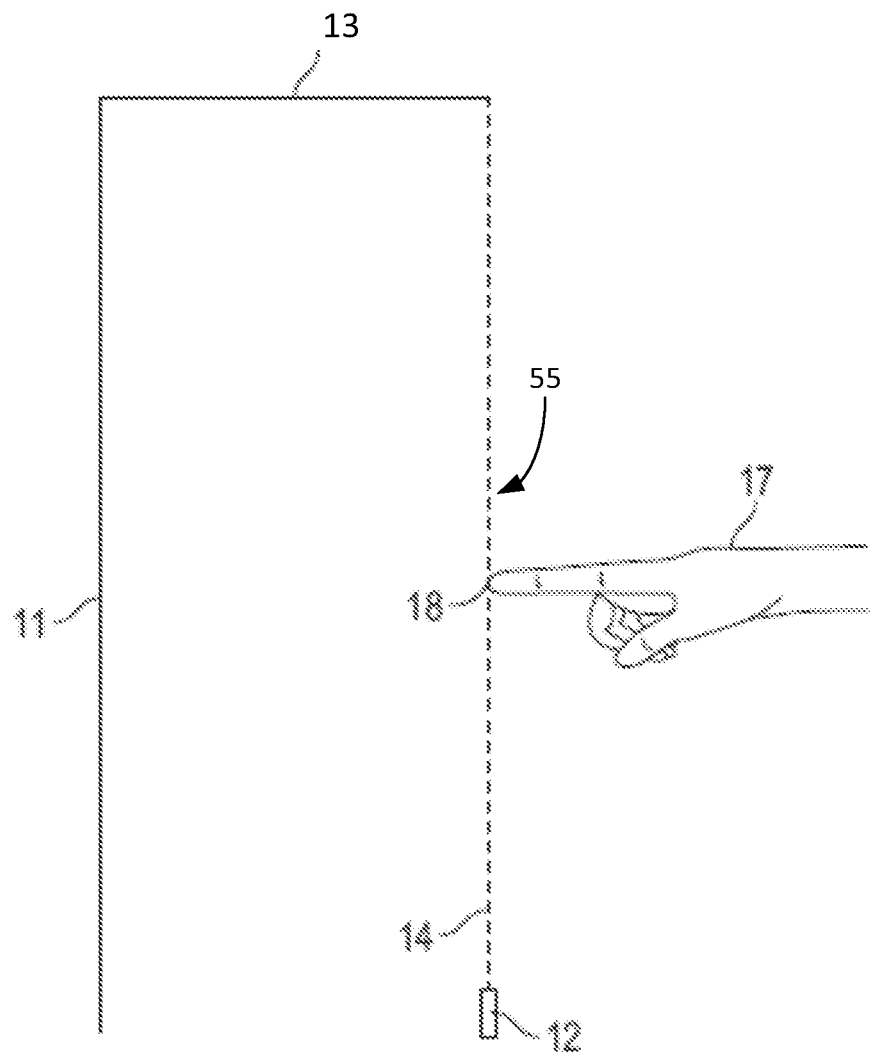
FIG. 12 illustrates an example of an embodiment of a contactless interface. In this embodiment, the floating image is generated parallel to the display 11. The interface includes a display 11 and an optical device 13. A touch sensor 12 is aligned parallel to a floating image 14, and emits a signal along the floating image 14 to form a detection zone 55. A user can make in in air contact 18 in the detection zone 55 that is sensed by the touch sensor 12. The touch sensor 12 communicates information bases on the position of the in-air contact 18 to the controller, which communicates information related to the position of the in-air contact relative to the floating image to a computing system.

FIG. 12 illustrates an example of a detection zone 55 aligned parallel to a display 11. In this embodiment, the optical device 13 is positioned orthogonal to the display, and is configured to generate a floating image 14 parallel to the display 11. The touch sensor 12 generates a signal when it senses a user performs an operation of indication 17 and makes an air contact 18 on a portion of, or near, the floating image 14 in the detection zone 55. The touch sensor communicates information relating to the position of the air contact to a controller, which can process the air contact as an input to a system.

Figure 13:
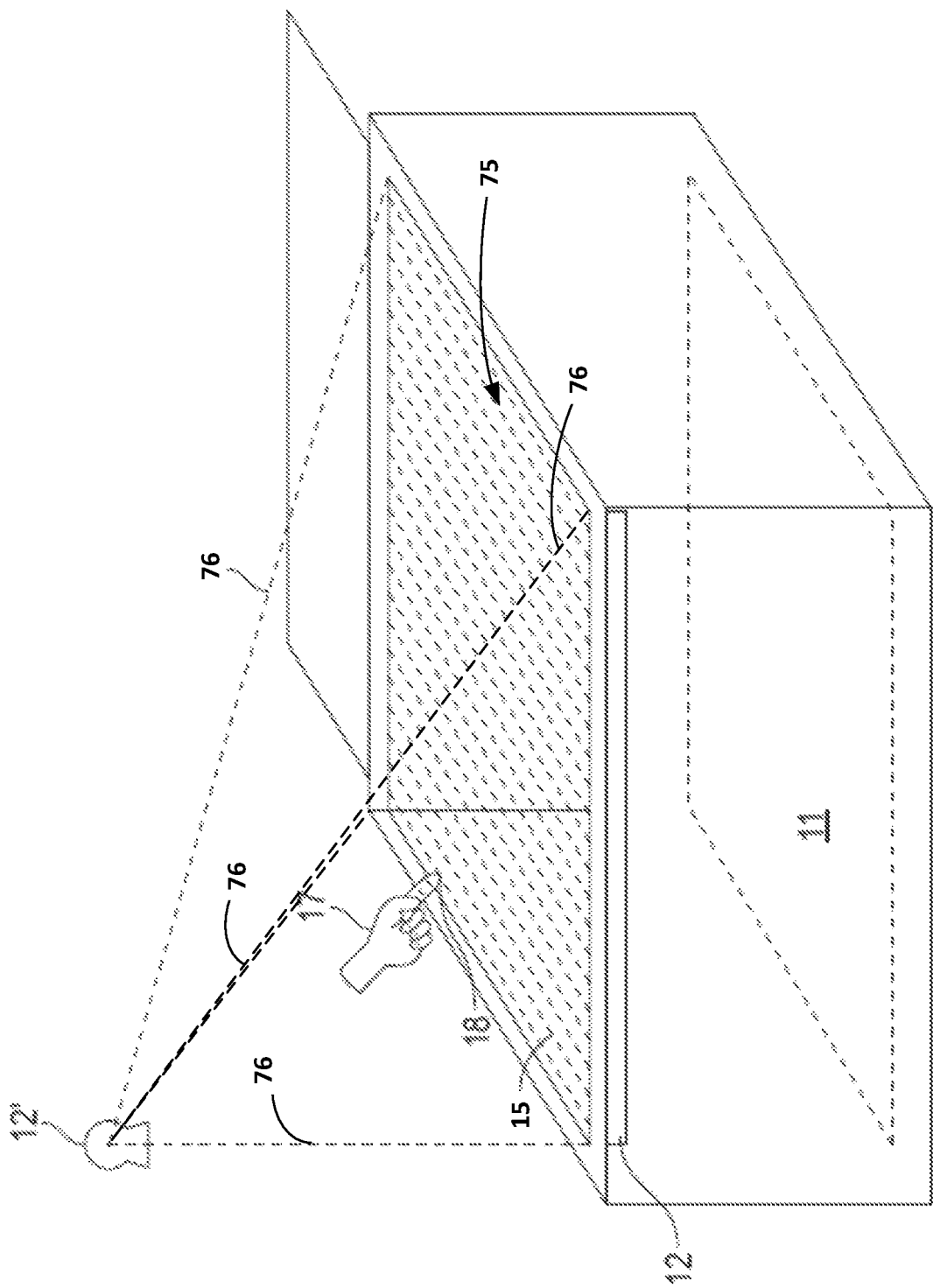
FIG. 13 illustrates an example of another embodiment of contactless interface.

FIG. 13 illustrates an example of another embodiment of contactless interface. In this configuration, the display 11 is positioned laterally on the bottom of a housing facing upward, the housing have an opening 75 facing upward through which a user can see the display 11. A user can make an air contact 18 in the opening over a portion of an image depicted on the display 11. A touch sensor 12 is configured to emit signals 15 across the opening of the housing such that the touch sensor can sense intrusions into the opening. When a user makes an air contact 18 in the opening, the touch sensor 18 senses the air contact 18 and determines an X,Y location of the air contact 18, and communicates information relating to the X/Y location to a controller (e.g., controller 50, FIG. 2). In another embodiment, a touch sensor 12' is a camera positioned above the opening 75 such it has the entire opening 75 in its field-of-view. The touch sensor 12' images the opening 75 and the X/Y position of the air contact is determined. In some embodiments, the touch sensor 12' includes functionality to determine the X/Y position of the air contact. In other embodiments, the touch sensor provides an image to controller that determines and X/Y position of the air contact.

Figure 14:
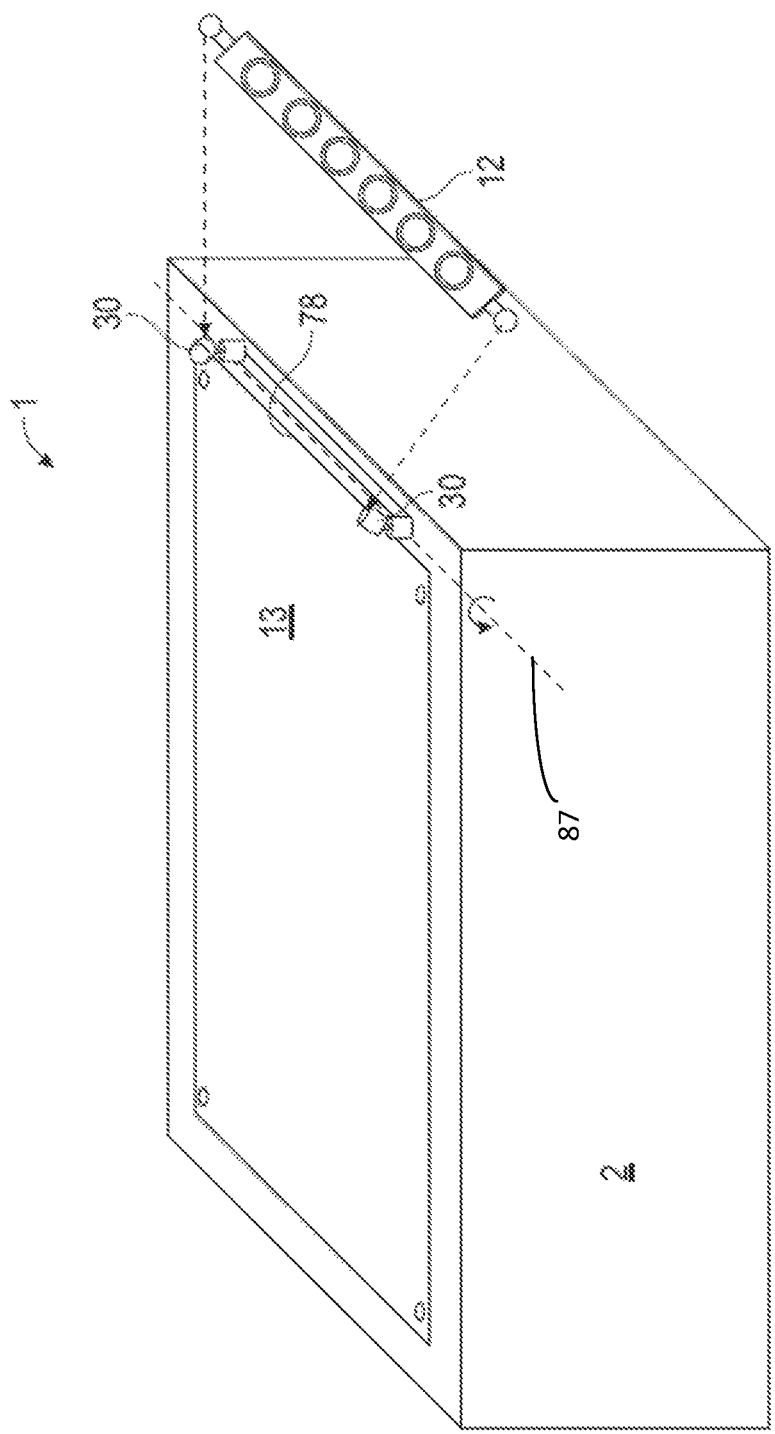
FIG. 14 illustrates another example of an embodiment of a contactless interface having a touch sensor that moves correspondingly to the position of a floating image.

FIG. 14 illustrates another example of an embodiment of a contactless interface 1 having a touch sensor 12 that moves correspondingly to the position of a floating image. In this embodiment, the touch sensor 12 is embodied as an array of sensors (e.g., an array of IR sensors). The touch sensor 12 is coupled to a mechanical arm 30 which is located adjacent to a perimeter edge 78 of an optical device 13. In various embodiments, the mechanical arm 30 can be part of a positional assembly. The mechanical arm 30 is configured to move (e.g., rotate) the touch sensor 12 along around a longitudinal axis 87 to align the touch sensor 12 with a floating image (not shown) generated above the optical device 13 such that the touch sensor 12 can detect an in-air contact with the floating image. That is, the touch sensor 12 is rotated such that the field of detection aligns with the face of the floating image such that the touch sensor 12 can sense an air contact made by a user on the floating image.

Figure 15:
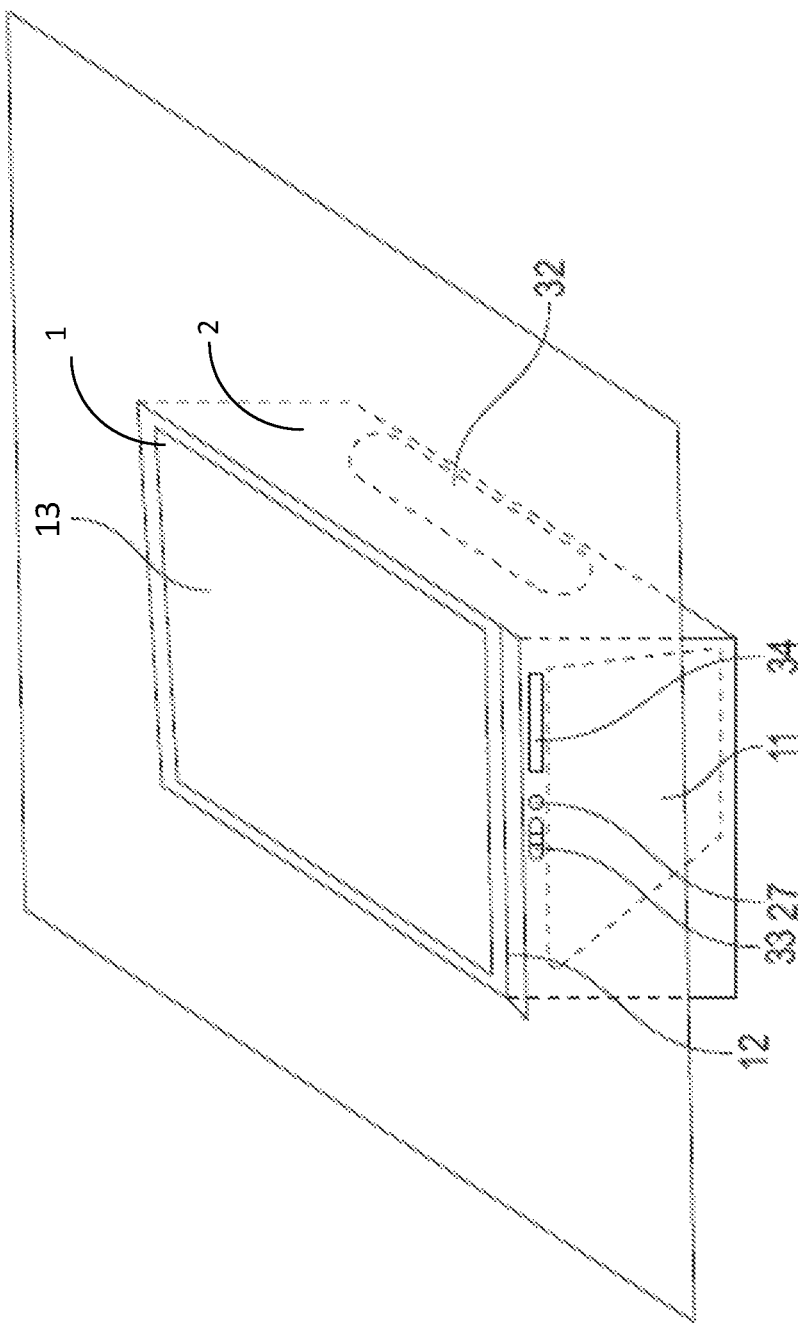
FIG. 15 illustrates another example of an embodiment of a contactless interface 1.

FIG. 15 illustrates another example of an embodiment of a contactless interface 1. The interface 1 includes a housing 2, and a display 11 positioned at an angle at one end of inside the housing 2, an optical device 13 positioned at the upper portion of the interface 1 either forming an external surface of the interface, or positioned below a transparent material forming the external surface. The interface 1 also includes a touch sensor 12 and a user sensor 27. In this embodiment, the interface 1 includes other optional user interface components including a microphone 33, and speakers 34. This embodiment also illustrates a configuration that includes a port or space for an external processor and/or computer 32. In this example, the interface 1 is embedded in a table. In other examples, the interface can be embedded in a wall, vehicle dashboard, hardware, machinery, etc. This example also shows the use of an external processor and/or computer 32. Note when saying external processor this means something (e.g., mini-computer) that plugs into the display to create the light-emitting device and/or other means of illumination 11.

Figure 16:
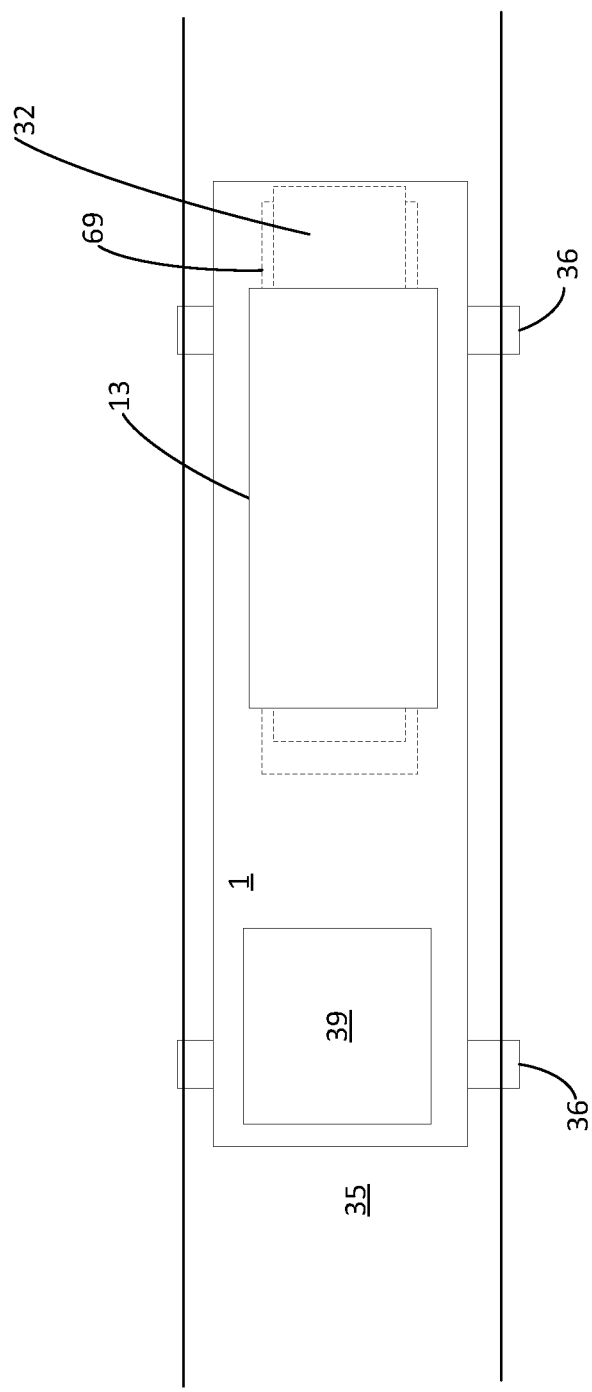
FIG. 16 illustrates an example of an embodiment of a contactless interface configured to be worn on a user's limb from a top view.
Figure 17:
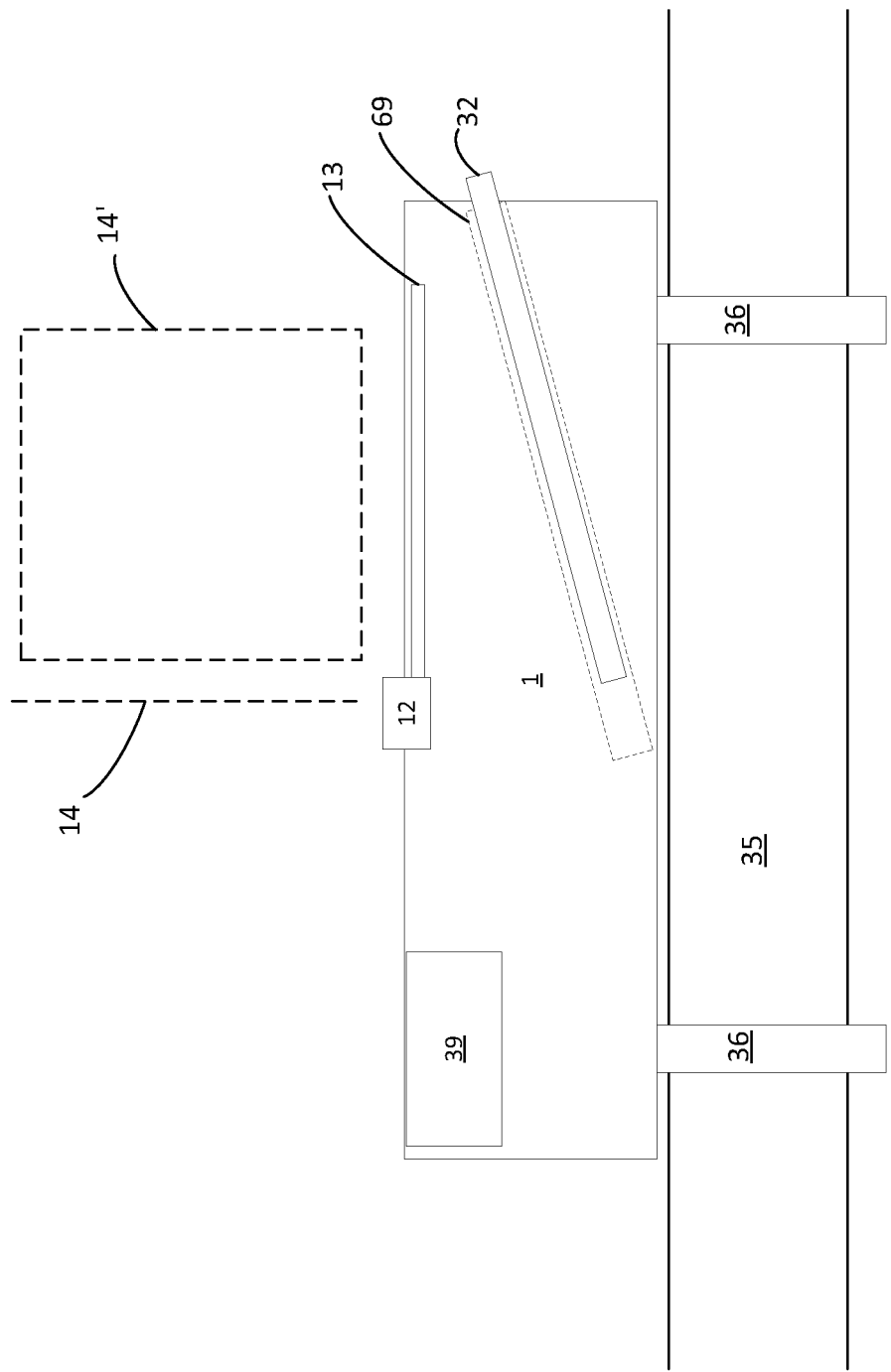
FIG. 17 illustrates a side view of the example of a contactless interface illustrated in FIG. 16.

FIG. 16 illustrates an example of an embodiment of a contactless interface 1 configured to be worn on a user's limb from a top view. FIG. 17 illustrates a side view of the example of a contactless interface 1 illustrated in FIG. 16. This embodiment of an interface is configured to be worn by a user. For example, worn on a user's arm 35, leg, or another body part, and held onto the user's limb by one or more straps 35. In some embodiments, the interface 1 can be incorporated on a garment or harness worn by the user. In this example, the contactless interface 1 includes an optical device disposed on the top of the interface 1, a touch sensor 12, and a computer port 69 configured to receive a computing device and hold the device at an angle relative to the optical device 13. An external computer 32 (e.g., a tablet, cell phone, of another mobile device) that has a display is placed in the computer port 69 such that display is facing the optical device 13, such that light emitted from the display propagates to the optical device 13, which reflects the light to form a floating image 14. Although in this example, the external computer 32 is inserted into the interface 1 from an end, as one of skill in the art will appreciate, such wearable contactless interfaces can be configured such that the external computer is inserted into the interface from the side, and the optical device is aligned to form a floating image with a different orientation (e.g., a floating image 14' facing towards the side of the interface). In some embodiments, the interface 1 can include a control interface 39 that can include a controller that is configured to operate the interface, a user sensor, a microphone, and/or speakers, and the like. The controller can communicate with the computer 32 (or another computer) to provide user input information to the computer 32 (or another computer) based on sensed air contacts.

Figure 18:
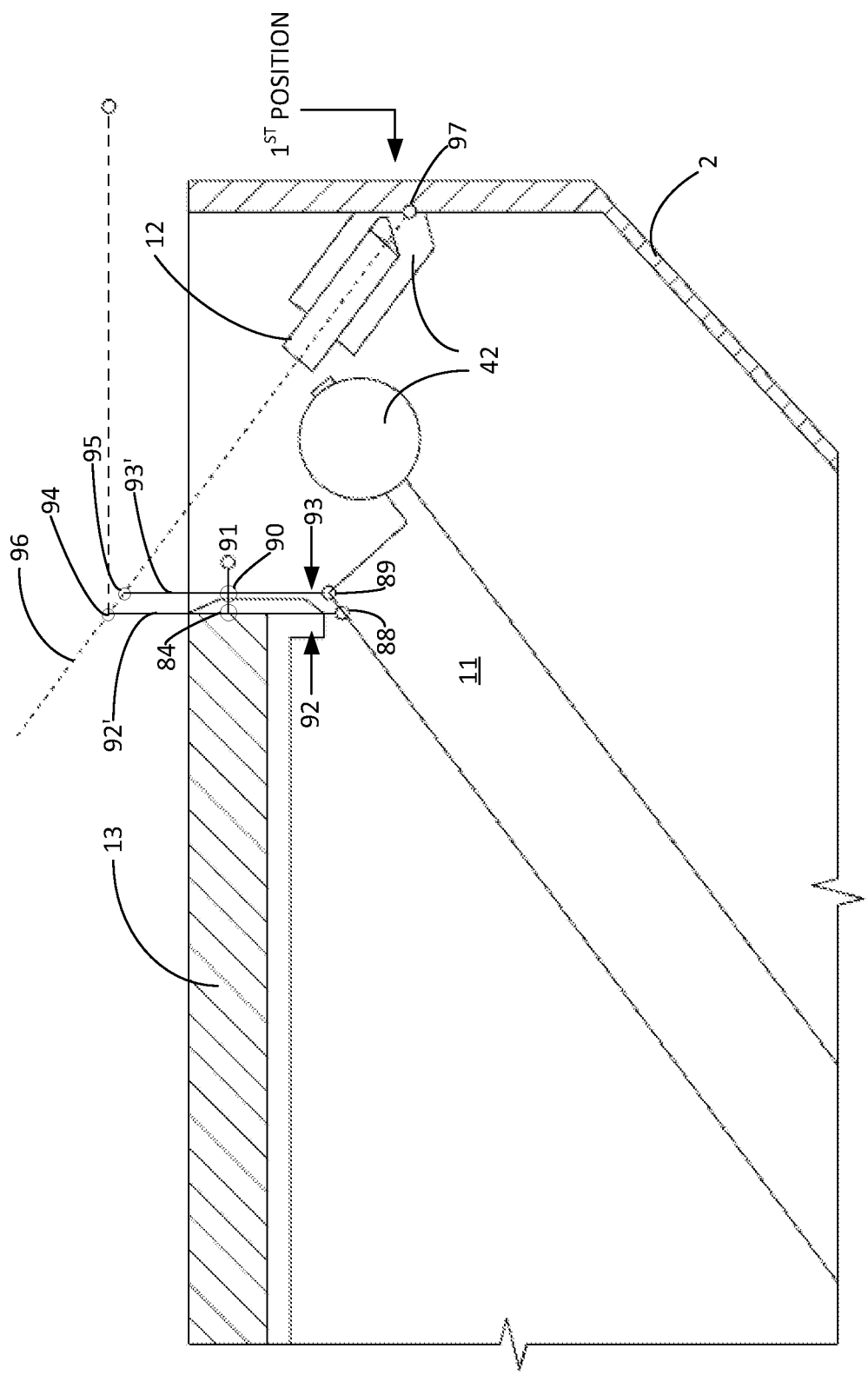
FIG. 18 illustrates an example of a floating image generated in a first position and a touch sensor in a first position that is correspondingly positioned with the floating image and aligned with the floating image to receive a user's input, according to some embodiments.
Figure 19:
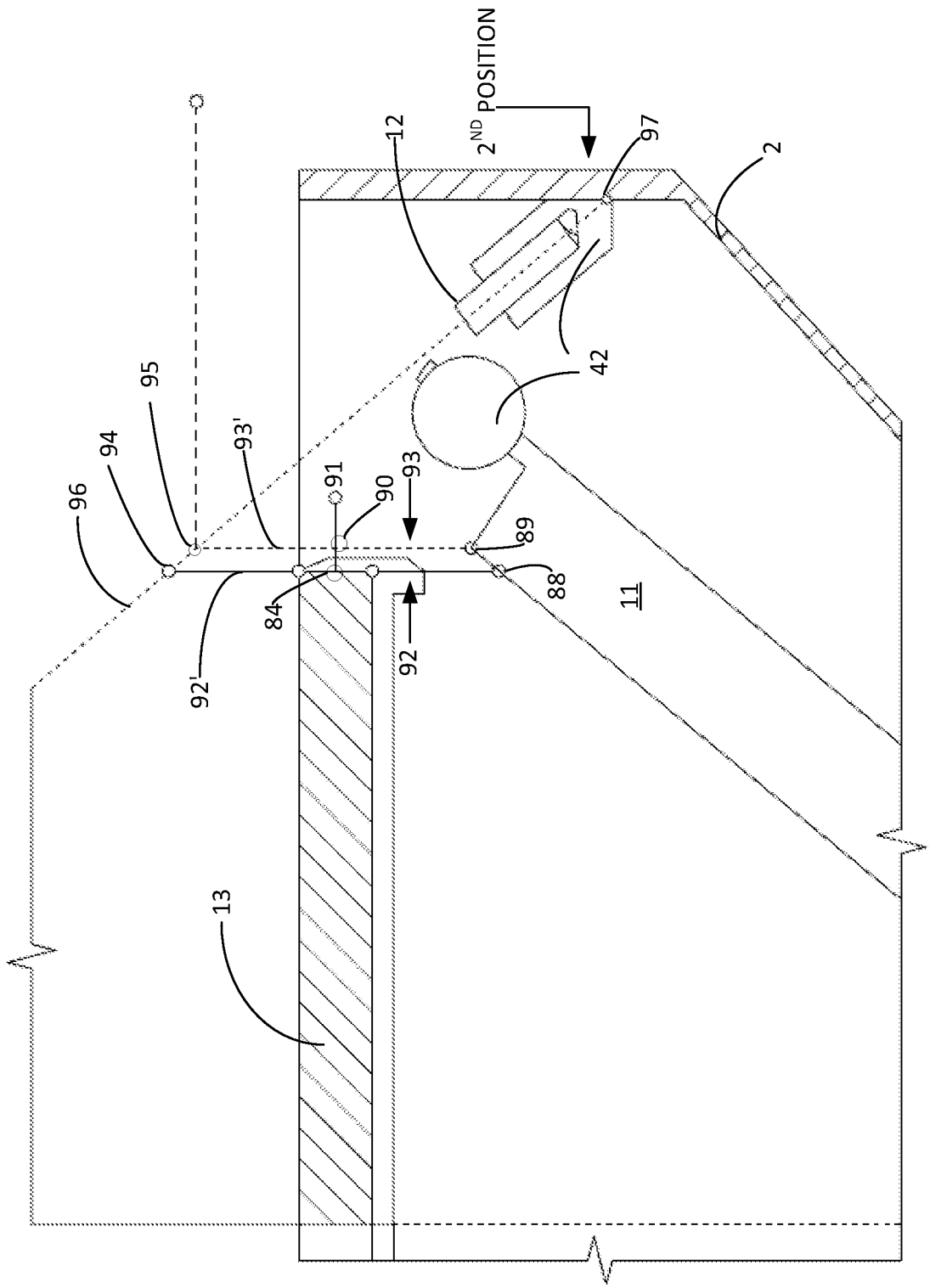
FIG. 19 illustrates an example of a floating image generated in a second position and a touch sensor in a second position that is correspondingly positioned with the floating image and aligned with the floating image to receive a user's input, according to some embodiments.
Figure 20:
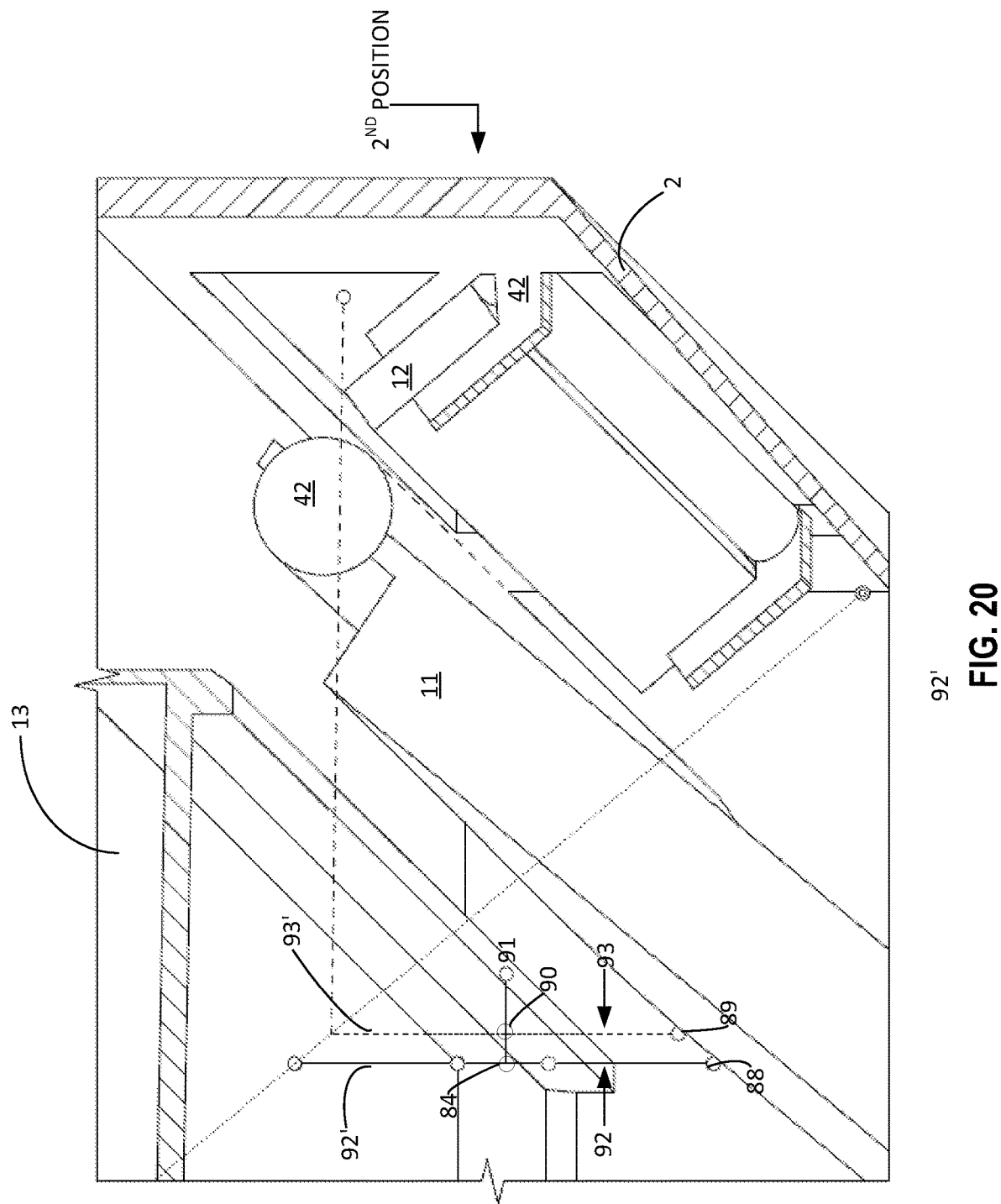
FIG. 20 illustrates an example of components of a positional system that moves the touch sensor along a vertical track as a display is rotated to correspondingly be positioned with the floating image and aligned with the floating image to receive a user's input, according to some embodiments.

FIGS. 18-20 illustrate an example of one embodiment of a contactless interface configured to move a display and correspondingly move a touch sensor such that the touch sensor is aligned with a floating image to sense an air contact made by the user. FIG. 18 illustrates an example of a floating image generated in a first position and a touch sensor in a first position that is correspondingly positioned with the floating image and aligned with the floating image to receive a user's input, according to some embodiments. FIG. 19 illustrates an example of a floating image generated in a second position and a touch sensor in a second position that is correspondingly positioned with the floating image and aligned with the floating image to receive a user's input, according to some embodiments. FIG. 20 illustrates an example of components of a positional system that moves the touch sensor along a vertical track as a display is rotated to correspondingly be positioned with the floating image and aligned with the floating image to receive a user's input, according to some embodiments.

The following is one example of setting up a contactless display. Other implementations may be setup differently. In this example, to best determine how to setup the display and touch sensor from FIGS. 18-20 to rotate in correspondence with the floating image 14 according to some embodiments, you may do the following. Starting with FIG. 18: first determine the total degrees your display can rotate in the housing you are using or are creating and use that range (we are going to assume 0-90 degrees in the following examples); determine the halfway point 84 on the closest side facing the user of the dihedral corner reflector array (DCRA) 13 (ex: 3.5 mm); draw a new line 91 that is 180 degrees from the halfway point 84 towards the user; draw a first line 92 straight down from the halfway point 84 at 180 degrees that intersects with the display to create a new point on the display 88; create a new line 92' that mirrors the first line length 92 above the halfway point 84 at 180 degrees to create the first sensor alignment point 94; create a new point on the top edge of the display 89 closest to the user; draw a line parallel to 92 starting from the edge of display point 89 to create a new line 93 above the display at 180 degrees that intersects with the new line from the halfway point 91 to create a new point 90; lines 89 and 91 should be perpendicular at 90 degrees; create a new line 93' above the new point 90 at 180 degrees, that mirrors the first line 93 and the length between points 89 and 90, to create a second sensor alignment point 95; draw the sensor line 96 that will determine the alignment of the sensor 12 by starting from point 94 draw a line that passes through point 95 that intersects with the inside of the housing 2 create a new point 97; set up a positional assembly 42 along the inside wall of the housing unit closest to the user at the new point 97 to hold and rotate the sensor 12, ultimately aligning the sensor with the sensor line 96;

FIG. 19, illustrates determining a second position of the display and touch sensor. By rotating the display with the first positional assembly 42 to this second position we will be able to determine how our second positional assembly 42 needs to rotate to align the touch sensor to the floating image 14. You may compare two or more positions to understand how to rotate the display and touch sensor to align the field of touch to the floating image 14. When used in conjunction with the user data (such as height, face, eyes, etc.) you can now align the floating image 14 to be in the field of vision of the user.

In some embodiments, you may calibrate the contactless interface apparatus 1 by setting fixed movement possibilities for different ranges of heights. For example, when determining the $1^{st}$, $2^{nd}$, and/or more positions, you may wish to set a height range of the user for a corresponding angle of the display. Furthering the example of this embodiment you determine 0 degrees, works best for user heights between 4 feet to 4 feet 4 inches; 15 degrees, 4 feet 4.1 inches to 4 feet 8 inches; 30 degrees, 4 feet 8.1 inches to 5 feet; 45 degrees, 5 feet 0.1 inches to 5 feet 4 inches; 60 degrees, 5 feet 4.1 inches to 5 feet 8 inches; and so on. For best results, the unit should be recalibrated if the contactless interface apparatus 1 is moved locations.

In some embodiments, you may calibrate the contactless interface apparatus 1 by using a camera in a position that can see the floating image 14 and the user's face, that determines the plane of the user's face; rotates the display and corresponding floating image 14 to be near in-line or parallel to the plane of the user's face; and then adjusts the touch sensor to align to the floating image 14. You may wish to compare two or more positions to determine movement of the display and touch sensor for proper alignment and calibration.

In some embodiments, the system may be calibrated (e.g., automatically calibrated) whenever it reboots or turns on. You may wish to recalibrate depending on change of environment, location, objects, user data, or other data detected by the camera and controller using the object detection/recognition software.

In some embodiments, to determine the plane of the face and the plane of the floating image so you can compare for alignment, you may use a facial or other user and object detection software, for example, Dlib, MLKit, CLM-Framework, OpenFace, or similar.

In some embodiments, you may calibrate by using two "still" images of a user's face, other object(s) or points in the room.

In some embodiments, information from a user sensor or tracker can be used to rotate the entire contactless interface apparatus 1 to "face" or best orient the apparatus to display the floating image to the user.

Figure 21:
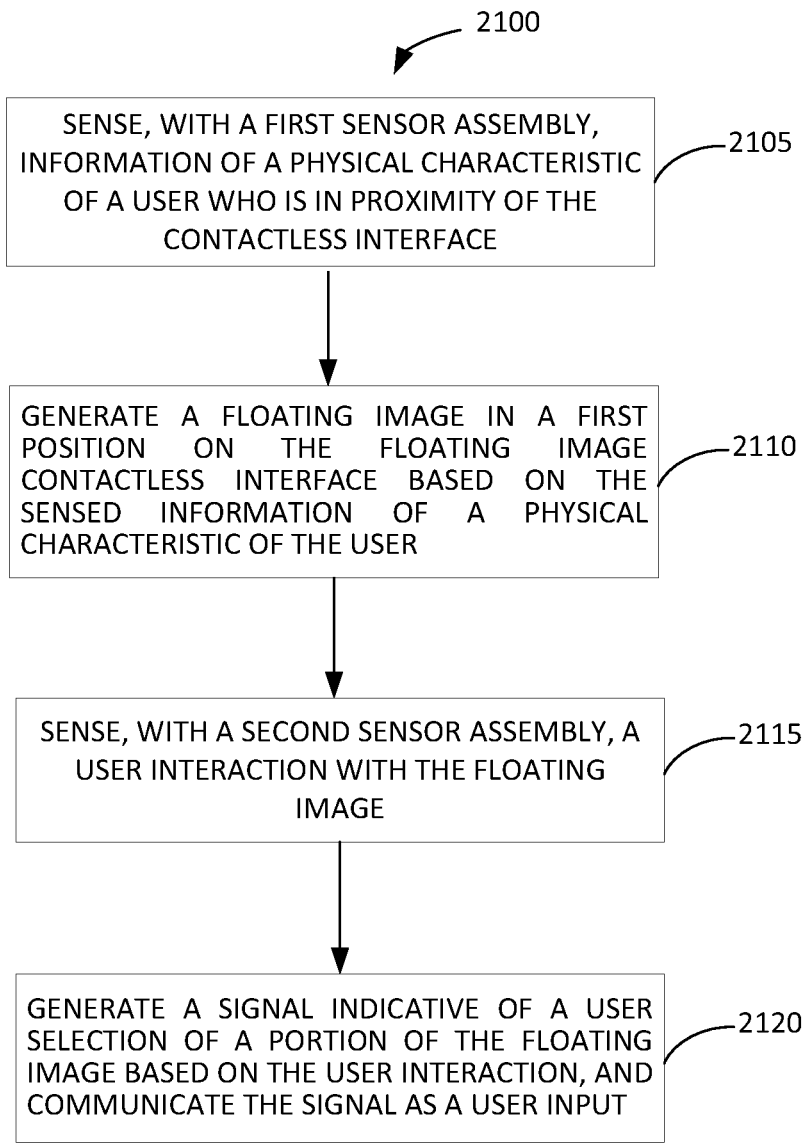
FIG. 21 illustrates an example of a process for operating a contactless interface, according to some embodiments.

FIG. 21 illustrates an example of a process 2100 for operating a contactless interface, according to some embodiments. At block 2105, the process senses with the first sensor assembly first information of a physical characteristic of a user in the proximity of the contactless interface. The physical characteristic may be, for example, the presence of the user, the height of the user, the position of the user's eyes, etc. At block 2110, the process 2100 generates a floating image in a first position on a floating image contactless interface based on the sensed information of the physical characteristic of the user. In some embodiments, generating a floating image in a first position based on the sensed information can include moving the display to a position to generate the floating image in the first position. In other embodiments, generating a floating image in a first position based on the sensed information can include moving the entire contactless interface (e.g., rotating the contactless interface) to a position to generate the floating image in the first position. In other embodiments, generating a floating image in a first position based on the sensed information can include the optical device (e.g., rotating the optical device) to a position to generate the floating image in the first position. In other embodiments, generating a floating image in a first position based on the sensed information can include moving one or more of the display, the optical device, the image system, or the entire contactless interface to position to generate the floating image in the first position.

At block 2115, the process 2100 senses with the second sensor assembly a user interaction with the floating image (e.g., an air contact). Finally at block 2120, the process generates a signal indicative of a user selection of a portion of the floating image based on the user interaction and communicates the signal as a user input (e.g., communicates the signal to a controller). The controller can provide positional information of the air contact received from the second sensor assembly to another device is an input indicating a user selection, or can process a positional information itself to take additional actions based on the user selection.

In the following examples, "save", is being stored in the computer readable storage medium (defined later). When references are made to "stored", "setup", "future use", or "future calculations", this implies the data is saved, or otherwise accessible for later use, in a computer readable storage medium.

In the following examples, and generally herein, a servo motor may be referenced as a mechanical arm. This does not limit in scope the type of motors and/or mechanisms that can be used to rotate, tilt, raise/lower, or otherwise move, either in lieu or addition to one or more servo motors. Other embodiments may use, for example, pulley motors, rack and pinion type gears, direct current (DC) motors, inverters, linear actuators, linear motors, etc.

Figure 22:
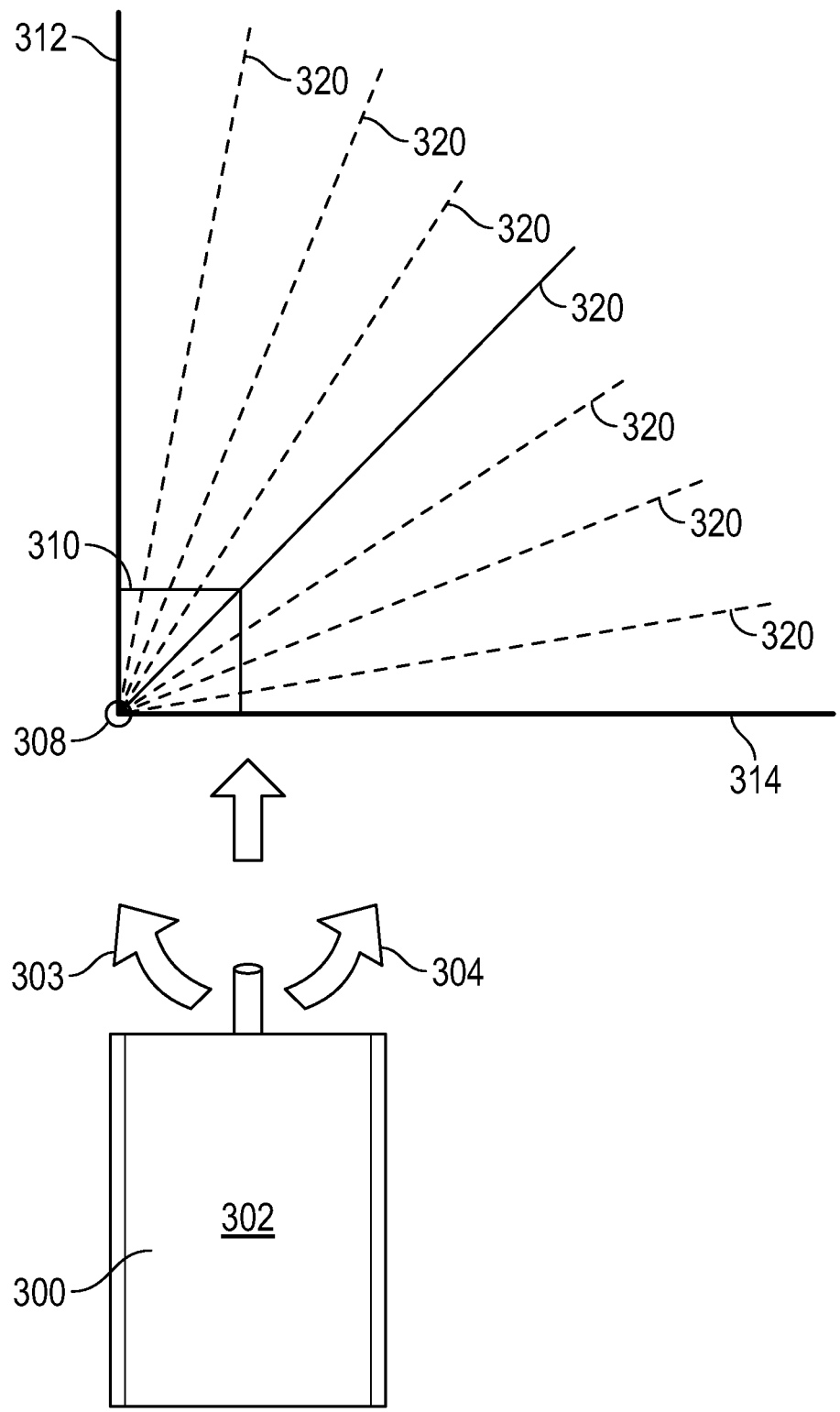
FIG. 22 illustrates an example of a schematic to setup and calibrate the movement of the contactless interface, and/or a component of the contactless interface, using a servo motor, according to some embodiments.
Figure 23A:
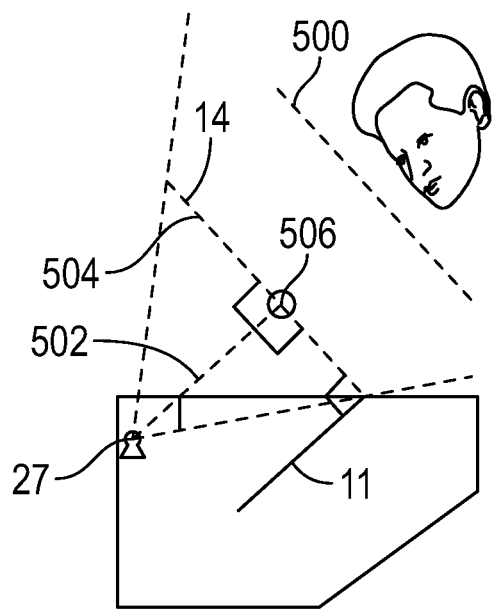
FIGS. 23A-23E illustrate an example of how to determine the facial orientation of a user, wherein moving (e.g., rotating) the hologram can be based on the determined facial orientation or a facial pose, according to some embodiments.
Figure 23B:
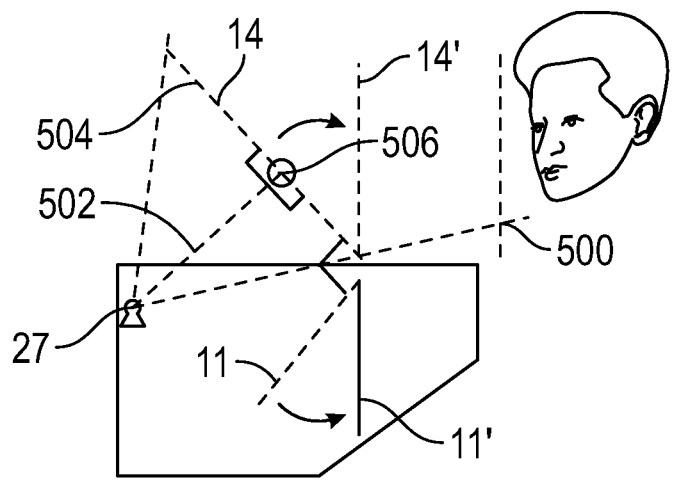
Figure 23C:
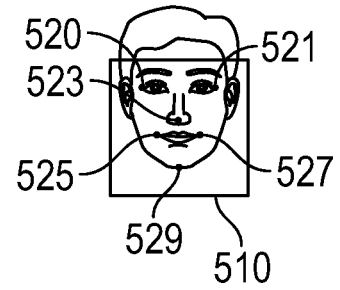
Figure 23D:
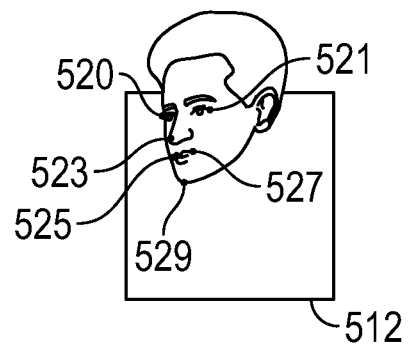
Figure 23E:
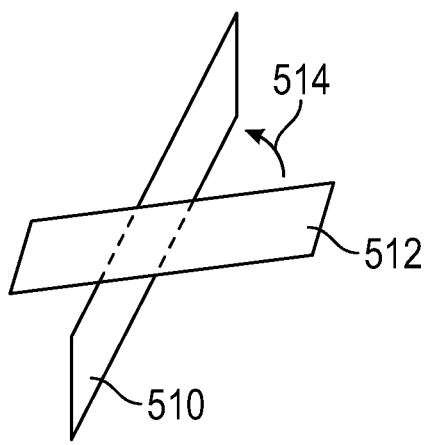

FIG. 22 illustrates an example of how to setup and calibrate the movement of the contactless interface 1 and/or component(s) of the contactless interface, using a servo motor 300, according to some embodiments. In some embodiments, a servo motor can be used to move the contactless interface and/or component(s). To calibrate determine how many degrees the desired component or interface can rotate, the total degrees 310, and a min degree 312 and a max degree 314, according to the embodiment and where it is going to be setup. In an example embodiment, the contactless interface can rotate between 0 to 90 degrees (while others it can be anywhere between 0 and 360 degrees).

The starting point of the servo motor should be the halfway point to allow maximum rotation to turn left 303 or turn right 304 which we will call a centered starting point 302 of the position of the servo motor (as is common with most servo motors) and this should be set equal to the halfway point 308 of the total degrees that the servo motor can rotate.

The software application sets the halfway point of the degrees, 45 degrees, equal to the centered starting point of the servo motor. The left most point and the right most point for rotation should also be set to 0 and 90 degrees respectively in the software. Calibrate using the 3 points at 0, 45, and 90 degrees at far left, center, and far right. These points are saved in the software application for future use. To add more calibration steps or degrees 320, divide the total degrees by the desired steps or reference points for calibration (ex: total of 90 degrees, 9 steps, 10 degrees separation between each). The software should now be able to use the steps and degrees for reference in future calculations. In this example, for every degree rotate the unit or component 1/90 of the defined rotation of the servo motor. If the servo can rotate 180 degrees and starts from the halfway point, save the far right and left points as 45 degrees and 135 degrees, so it rotates only 90 degrees.

FIGS. 23A-23E illustrate an example of how to determine the facial orientation 500 of a user, wherein moving (e.g., rotating) the hologram can be based on the determined facial orientation or a facial pose, according to some embodiments. The embodiment corresponding to FIGS. 23A-23E may be similar to the embodiments illustrated in FIGS. 18, 19, and 20 with the addition of the first sensor assembly 27 being a webcam. Some embodiments of the contactless interface, may include a webcam as the first sensor assembly, an IR sensor array as the second sensor assembly, a servo motor as (or with a mechanical arm) to rotate the second sensor assembly, a display 11, a second servo motor (as or with a mechanical arm) to rotate the display, a DCRA as the optical device, and a micro-computer running Windows 11 as the controller. The first and second assemblies are both connected to the micro-computer. The micro-computer (the system) is connected to the display and the light emitted from the display reflects off the DCRA to form the floating image 14. The IR sensor (second sensor assembly) should be in-line with the floating image. Please refer to the description for FIGS. 18, 19, and 20 to understand one way to align an IR sensor to a floating image. To align the floating image to the user in this example embodiment, only the display and the IR sensor (second sensor assembly) rotate.

In some embodiments, the floating image plane can be near inline, or inline, to the plane of the user's face, when they are interacting with the hologram. In other embodiments, the data used to determine if a user is interacting with or is in range of the hologram may include, inter alia, other facial features, line of sight, height, objects, etc. The system can have a software application that configures one or more computer hardware processors for calculating and aligning the display and second sensor assembly. Such software application(s) that configure one or more computer hardware processors for certain functionality can be referred to herein as "software" for ease of reference. The software can compare a virtual image orientation plane, still image, or other "world coordinates" when comparing to the orientation of the user's face for determining the degrees of separation on the X-axis between the two (in some embodiments, the degrees of separation on the Y-axis and/or Z-axis, are used). This still image or virtual image orientation plane is saved in the application for later use (e.g., saved in memory of a computing device running the software application). By centering the webcam with the starting floating image (even if not visible by calculating the floating image orientation from FIGS. 18-20) it will make it easier to setup and calculate the virtual image orientation plane differential to the floating image. If the facial orientation plane is inline or near inline to the virtual image orientation plane, the unit should not readjust. In the event the plane is not inline, the display should rotate so the resulting floating image is rotated to be inline or near inline to the user's facial orientation plane. To minimize excessive readjustment of the unit, software features that control readjustment can be features including, inter alia, it should only adjust once a user is detected and if the facial orientation plane is within a defined range of degrees of the virtual image orientation plane, or if the user has not yet made any input.

Options for computer vision APIs are available by Google in ML Kit, MediaPipe Face Mesh, OpenCV, or another computer vision vendor and software of your choice—preferably that already has facial recognition and detection. The three APIs that seem to be the best fit at this time of writing from Google's ML Kit for example, is the face detection API, face mesh detection API, and the pose detection API. The pose detection API has the same features as face detection API, but does not have context such as smiling, open eyes, etc. which may be useful in some embodiments. The pose detection API returns a full-body 33 point skeletal match (landmarks) that includes facial landmarks (ears, eyes, mouth, and nose) and points on the hands and feet. For points outside of the range, the values are simply assigned coordinates outside of the image and the 33 points are given a scale of 0.0-1.0 on the confidence the landmark is within the image. A face must be detected to return results of a pose. The landmarks of the face for the pose detection API at the time of writing includes the nose, left eye inner, left eye, left eye outer, right eye inner, right eye, right eye outer, left ear, right ear, left mouth, right mouth. Use these points to generate a facial orientation plane. There are several algorithms for pose estimation.

Other libraries for computer vision you might consider that are great for determining a user's facial orientation and the plane associated are OpenCV, Dlib, CLM-framework (deprecated), OpenFace, among others. OpenFace for instance, already helps to draw a 3D plane (facial orientation plane) from the orientation of a user's face. As a note, OpenFace is open source and does allow for commercial use, but you must pay for a license. Dlib is free, open source, and can be used in commercial applications at this time of writing.

Draw, generate, or use an image for the virtual image orientation plane that should be parallel to the floating image calculated in reference to FIGS. 18-20. In some embodiments, to simplify, use the starting calculated floating image as the virtual image orientation plane and save for later use.

Head pose estimation and orientation, the facial orientation plane 500, normally requires at least these six points: left eye outer corner 520, right eye outer corner 521, tip of the nose 523, outer left corner of the mouth 525, outer right corner of the mouth 527, and the chin 529. In other embodiments, you may use less or more points. A plane can be defined with three or more 3D points.

In some embodiments, the head pose estimation and orientation can be used to rotate, tilt, and/or raise/lower the contactless interface and/or components of the contactless interface, inter alia, the display, a sensor assembly, or the optical device.

Ranges for adjustment can also be stored in memory, local storage, and/or remote storage (example, only rotates the interface if the facial plane is off by 30 degrees or more from floating image plane). The servo motor can be calibrated by setting the furthest left, center, and furthest right points; it can rotate the display and corresponding angles set in the custom software for controlling the servo. For this example, the display can rotate 90 degrees. 0 degrees is parallel to the optical device and 90 degrees is perpendicular. Determine the set points the servo can rotate the display, such as at increments of 15 degrees: 0, 15, 30, 45, 60, 75, and 90 degrees. These values will be stored in memory, local storage, or remote storage for future usage and when the unit turns off or on.

The more points set (minimum two points) the servo can rotate to, the more calibration points will be needed for accuracy, but will result in more defined orientation of the floating image to the user. For this embodiment, set the starting angle of the display at 45 degrees and the webcam's center focal point 506 is the center of the starting floating image. FIGS. 18-20 and the corresponding description illustrates examples on how to determine this. The starting floating image is saved and used to map our "virtual image orientation plane" 504 which can be used for future calculations. If the system detects that the user's facial orientation plane is within 7.5 degrees (increment rate divided by two; 15/2) of the virtual image orientation plane, then do not rotate. If the system detects that the user's facial orientation plane is less than or greater than 7.5 degrees from the starting position, then rotate the display to the closest display orientation. Two examples could be if the detected facial orientation plane is 30 degrees above the virtual image orientation plane (45 degrees), then rotate the servo motor and display to the 75 degree point; or if the detected facial orientation plane is 10 degrees below the virtual image orientation plane, then rotate the servo and display to the 30 degree point. In some embodiments, if the system detects the user's facial orientation plane is less than or greater than 45 degrees+error correction (let's say 10 degrees) from the originating point, do not rotate, since the person is most likely not looking at the unit.

The virtual image orientation plane is stored as an image, set of coordinates, and degrees relative to the optical device. The set of coordinates and degrees are used in the calculation between plane one 510 and plane two 512 for determining how many degrees the two planes are apart 514. This is used to determine how far to rotate the components, according to some embodiments.

To calculate the angle between two planes, P1: $A_1x+B_1y+C_1z+D_1=0$ and P2: $A_2x=B_2y+C_2z+D_2=0$, use the following equation:

$$\cos \theta = |(n_1 \cdot n_2)|/(|n_1| \cdot |n_2|)$$

$$\cos \theta = |(A_1A_2+B_1B_2+C_1C_2)|/[\sqrt{(A_1^2+B_1^2+C_1^2)}\sqrt{(A_2^2+B_2^2+C_2^2)}]$$

Example Node.js:

```
function angle(a1, b1, c1, a2, b2, c2)
{
  var d = a1 * a2 + b1 * b2 + c1 * c2;
  var n1 = Math.sqrt(a1 * a1 + b1 * b1 + c1 * c1);
  var n2 = Math.sqrt(a2 * a2 + b2 * b2 + c2 * c2);
  d = parseFloat(d / (n1 * n2));
  var pi = 3.14159;
  var angle = (180 / pi) * Math.acos(d);
  console.log("Angle is " + angle.toFixed(1) + " degree");
  return angle.toFixed(1)
}
// Driver Code
var a1 = 1;
var b1 = 1;
var c1 = 1;
var d1 = 1; // not used
var a2 = 2;
var b2 = 2;
var c2 = 0;
var d2 = -1; // not used
angle(a1, b1, c1, a2, b2, c2);
```

The example output returned above is: 35.3. Following the example, the servo motor(s) would rotate the display and second sensor assembly 35.3 degrees (in their respective directions) to maintain alignment, or if incremented for example by 15 degrees, round to closest incremental step (30 degrees).

Figure 24:
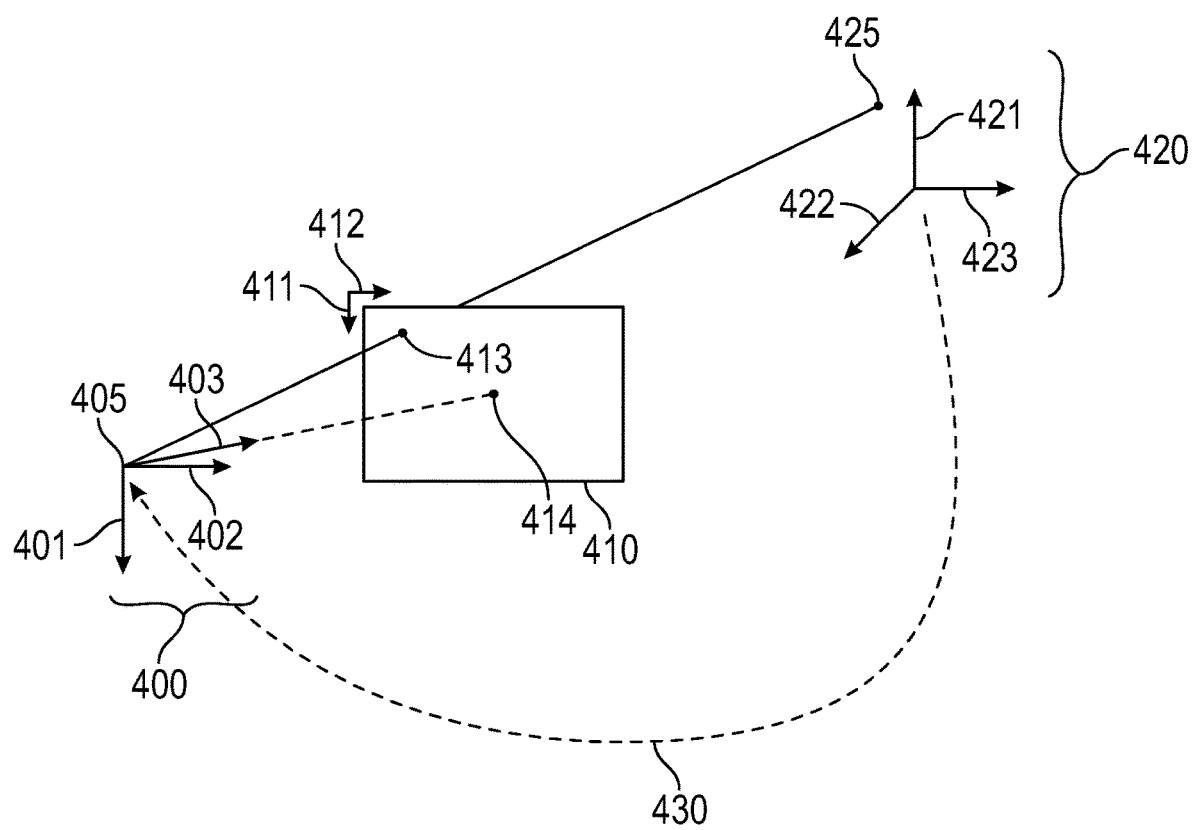
FIG. 24 is a schematic that illustrates an example of estimating the head pose to determine a facial orientation plane, according to some embodiments.

FIG. 24 illustrates an example of estimating the head pose to determine the facial orientation plane, according to some embodiments. To calculate the 3D pose of a user's face, it would be recommended to use one of the mentioned libraries and one of their defined functions, such as OpenCV functions solvePnP or solvePnPRansac, since they already take multiple algorithms, averages, and lots of open source imaging data to fine tune results. For those that want to create their own, FIG. 24 gives some insight in how to do that. There is plenty of material in the public domain related to head pose and determining, estimating, and calibrating coordinates and results. The first known pose estimation algorithm dates to 1841.

According to some embodiments, to calculate the 3D pose of a user's face without one of the pre-written functions, 2D coordinates of a few points from the image and corresponding 3D coordinates of those points are required. The 2D (x,y) coordinates required are from the face is the tip of the nose, the chin, the left corner of the left eye, the right corner of the right eye, the left corner of the mouth, and the right corner of the mouth. Dlib's facial landmark detector or Google's ML Kit, for example, can provide us with those points. While you can use a 3D model of the person, in most cases this is impractical, and a generic 3D model will suffice. The six 3D points are:

Tip of the nose: (0.0, 0.0, 0.0)
Chin: (0.0, −330.0, −65.0)
Left corner of the left eye: (−225.0, 170.0, −135.0)
Right corner of the right eye: (225.0, 170.0, −135.0)
Left corner of the mouth: (−150.0, −150.0, −125.0)
Right corner of the mouth: (150.0, −150.0, −125.0)

These points are in an arbitrary reference frame/coordinate system. This is called the World Coordinates (Model Coordinates in OpenCV).

The camera is assumed to be calibrated by knowing the focal length of the camera, the optical center in the image, and the radial distortion parameters. In various embodiments the camera can be calibrated, or it can be used in an approximate manner which can be sufficient for many implementations. To approximate the optical center by the center of the image, approximate the focal length by the width of the image in pixels, and do not count for radial distortion.

The common theme being these three coordinate systems: world coordinates, camera coordinates, and an image plane. The camera coordinates are the rotation and translation of the face, the pose. The image coordinate system is the 3D camera coordinates projected onto the image plane using intrinsic parameters of the camera, inter alia, focal length, optical center, etc. While there are a lot of resources available online explaining how to project the 3D coordinates into the image plane and error correcting associated distortion, see OpenCV:
https://does.opencv.org/2.4/modules/calib3d/doc/camera_calibration_and_3d_reconstruction.html.

To summarize an example of a possible embodiment related to multiple figures, inter alia, 18, 19, 20, 22, 23, 24 and 27, determine the user's facial 3D world coordinates (tip of nose, chin, two corners of eyes, two corners of mouth) from a 2D image to determine our facial orientation and corresponding facial orientation plane. Apply an error of correction for radial distortion from the camera. There are libraries that already do these calculations, including error correction for radial distortion, but can also be implemented from scratch using one or more algorithms. Calibrate the camera to the center position of the floating image. Calibrate the servo motor(s) (most already have set degrees and steps, i.e., 1 degree is 1 step, which makes this easy out of the box) for the display and IR sensor (second sensor assembly). The virtual image plane can be determined in several ways, inter alia, using the default world coordinates for facial points previously mentioned and corresponding 2D coordinates, calculating the IR sensor line of sight (FIGS. 18-20), generating a parallel plane to the webcam lens (assuming the focal point is centered), a static image, etc. All associated data should be stored in a computer readable storage medium for future calculations. Get the angle between the facial orientation plane and the virtual image plane to determine how far to rotate the display and IR sensor array (second sensor assembly). Do not rotate if calculated to an error degree that the user is not looking at the unit, if they have already interacted with the unit, or out of a predetermined range (example, more than 2 feet away). Adjust, if needed, every 10 sec until the user makes a selection. Set back to starting position if user exists predetermined range (example, more than 5 feet away).

Figure 27:
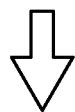
FIG. 27 illustrates an example of a basic pose estimation algorithm from a 2D image to 3D World Coordinates, according to some embodiments.

To understand FIG. 24 can be used to determine our facial orientation plane from a 2D image (such as a webcam) to 3D World Coordinates, according to some embodiments, refer to FIG. 27. FIG. 27 gives reference to the annotations and enumerated components in FIG. 24.

Figure 25A:
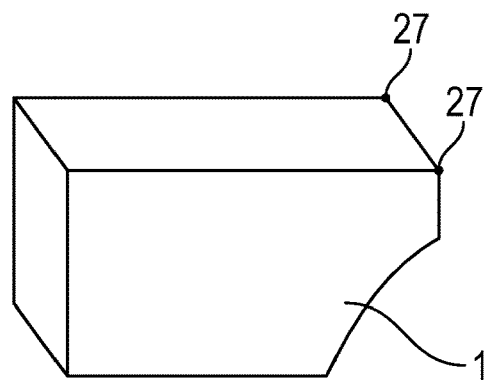
FIGS. 25A-25C illustrates an example of a first sensor assembly to rotate the contactless interface, according to some embodiments.
Figure 25B:
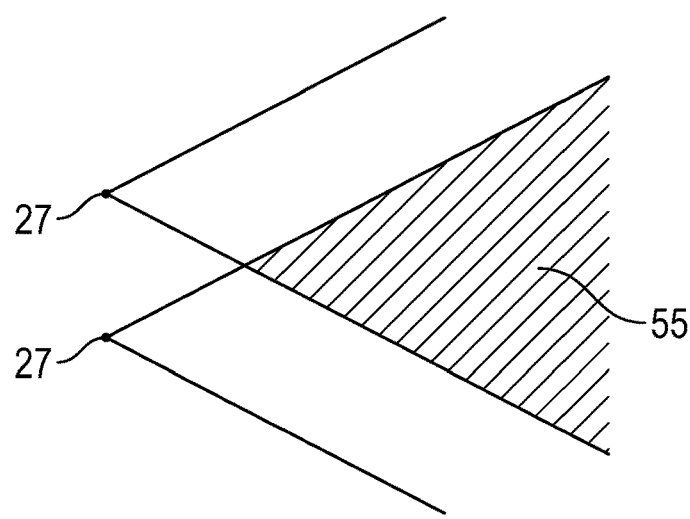
Figure 25C:
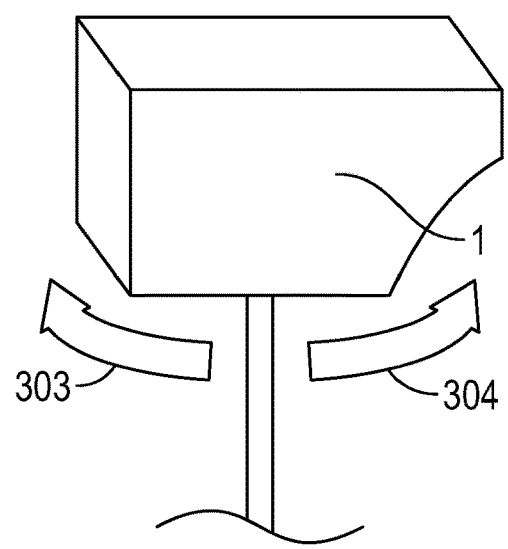

FIGS. 25A-25C illustrates an example of a first sensor assembly to rotate the contactless interface 1, according to some embodiments. The first sensor assembly consists of two ultrasonic sensors 27 that can triangulate a position, as visually demonstrated in the overlapping and shaded region 55 in FIG. 25B. In this embodiment, the contactless interface rotates left 303 and right 304.

Figure 26:
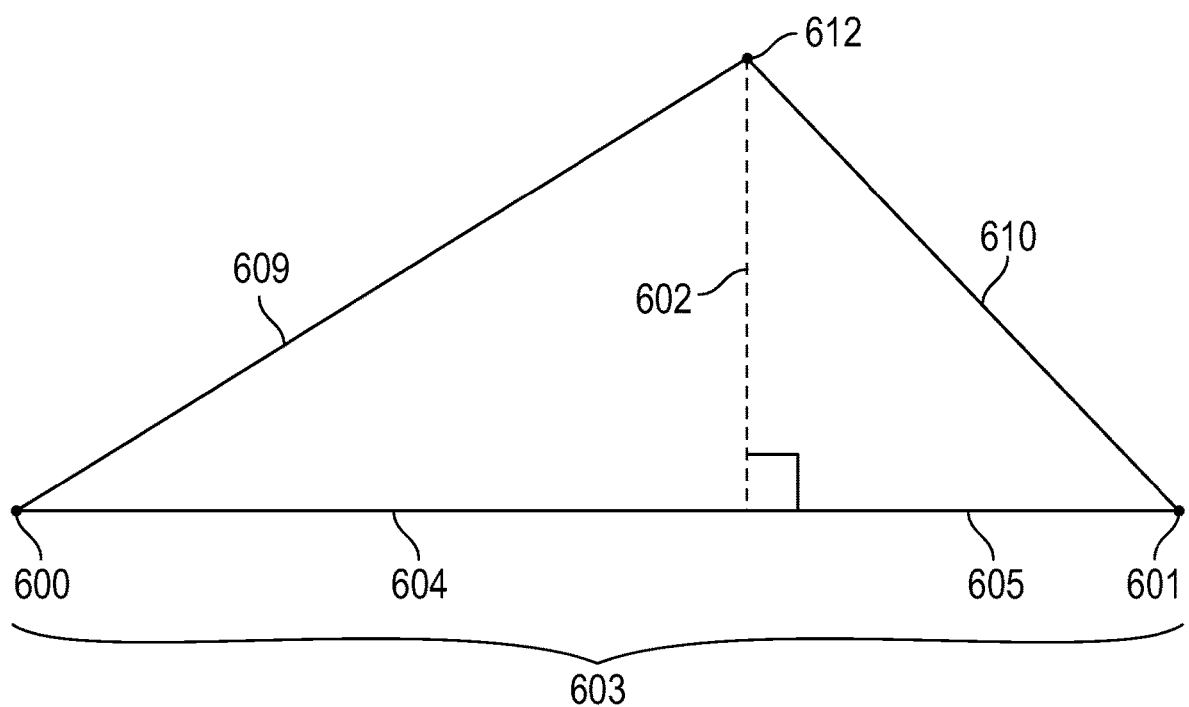
FIG. 26 illustrates an example of how to calculate the x/y coordinates (position) of a user, according to some embodiments.

FIG. 26 illustrates an example of how to calculate the x/y coordinates (position) 612 of a user, according to some embodiments. FIG. 26 is in reference to FIG. 25 and the shaded area 55 in 25B. You can use trigonometry to determine the position in the overlapping area. One ultrasonic sensor does not have enough data to triangulate position. To solve for the y coordinate (the height) 607, rearrange the area formula from area=base*height/2 to height=area*2/base. To determine the x coordinate, ensure the first ultrasonic sensor 600 and second ultrasonic sensor 601 can receive a signal, but only the first ultrasonic sensor can send a signal. To calculate the distance to the object or user from first ultrasonic sensor 609, d1 (cm)=time (ms)/59. To calculate the distance to the object or user from second ultrasonic sensor 610, d2 (cm)=time (ms)/29.5−d1. For questions regarding the distance equations, search distance calculation for ultrasonic sensors. The time is measured in microseconds and considered with the speed of sound. The distance between the first ultrasonic sensor and the second ultrasonic sensor 603 is, d3=abs(d2−d1) (abs=absolute value; known as the baseline). With the 3 lines that make up a triangle, solve for the half perimeter, using Heron's formula, s=(a+b+c)/2. Solve for the area, area=sqrt(s*(s−a)*(s−b)*(s−c)). Plug the area into the y coordinate formula, height=(sqrt(s*(s−a)*(s−b)*(s−c))*2)/abs(d1−d2). The x coordinate can be calculated by dropping a perpendicular from the triangle vertex to the baseline to create a right-angled triangle 604, 605. Using Pythagoras theorem, x=sqrt(b2−h2). In some embodiments, the system updates every X milliseconds (ex: every 1000 ms) the location of the object or user. Depending on settings in the custom software application that controls the ultrasonic sensors and servo motors, use the determined x/y coordinates and send a signal from the processor, to rotate the servo motor and the contactless interface to the left or right. In some embodiments, this is a continuous movement. In other embodiments, it happens in set intervals (example, update every 5 seconds). In some embodiments, it only checks for coordinates and rotates if object or user detected in a defined range of the first ultrasonic sensor.

FIG. 27 illustrates a basic pose estimation algorithm from a 2D image to 3D World Coordinates 420, according to some embodiments. FIG. 27 is in reference to FIG. 24 and is provided to explain some basic theory, but is not enough to have a stable implementation on its own. There are advanced algorithms and libraries over thousands of developer hours that have been built on this initial theory that should likely be used instead of creating from scratch. Instead, use one of the earlier mentioned libraries, such as OpenCV, or do a search for pose estimation and facial recognition software. The camera coordinates 400 are the rotation and translation of the face, aka the pose. The image coordinate system is the 3D camera coordinates projected onto the 2D image plane using intrinsic parameters of the camera, inter alia, focal length, optical center, etc.

O 405 is the camera's center point and is focally centered on point c 414 of the image plane 410. By finding the projection p 413 of the 3D point P 425, we can plot the point onto the image plane which is how we determine orientation or the pose.

If we knew (U 422, V 423, W 421) of a 3D point Pin World Coordinates, the rotation R (3×3 matrix) and translation t(3×1 vector) of the world coordinates in relation to the camera coordinates, we can calculate the location (X 402, Y 401, Z 403) on the point p in the camera coordinate system. Use expanded equation from FIG. 27 and use the principle you may have learned in your Linear Algebra class that if we knew enough corresponding points, we can "solve" for the unknowns. If we knew (U, V, W) and (X, Y, Z) we can solve for the $r_{ij}$ and $(t_x, t_y, t_z)$. Since we can only know (X, Y, Z) up to some unknown scale we have a degree of error that we can try to compensate for using the direct linear transform method or the Levenberg-Marquardt optimization method. The functions solvePnP and solvePnPRansa from OpenCV uses multiple algorithms to improve the accuracy. Since these algorithms already exist for many of the libraries and software we listed before from OpenCV, Google MLKit, Dlib, etc. it's best to use an existing one that has been tested for lots of error correction than creating from scratch.

The following are additional examples of some possible embodiments of a contactless interface. At least one sensor is required (e.g., a camera) to determine the distance of the user, defining characteristics of the user such as height and location of the eyes, other objects detected to further determine orientation of the floating image to the user in combination with the controller. Some examples may use a camera, IR sensor, or other optical device. While this is not an exclusive list, these are some of the combinations of one or more components and/or the system as a whole:

Whole unit
Display
Sensor
Optical Device
Whole unit+Display
Whole unit+Optical Device
Whole unit+Sensor
Display+Sensor Display+Optical Device
Sensor+Optical Device
Whole unit+Display+Sensor
Whole unit+Display+Optical Device
Whole unit+Sensor+Optical Device
Display+Sensor+Optical Device
Whole unit+Display+Sensor+Optical Device In some embodiments, a contactless interface can be set-up in the following manner. Setup a display case in the shape of a cube with an opening on one of the sides. For this example, we will assume the user chose to have the opening at the top of the cube. Then place a display 11 inside the display case facing away from and with the back of the display 11 touching the side closest to the end-user, with the display 11 placed at zero (0) to ninety (90) degrees relative to the opening. In this example, we will assume that one places the display 11 at ninety (90) degrees relative to the opening. In this example, the optical device 13 should be placed at the top of the opening and parallel to the bottom of the cube. The floating image 14 should now be displayed at ninety degrees relative to and above the optical device 13. A touch sensor 12 can be placed either inline or close to inline with the floating image 14 for optimal results. In this example, the touch sensor 12 can be placed slightly in front of the optical device 13 to best line up with the floating image 14. The touch sensor 12 is connected to a controller 50 and communicate information of an indication 17 of a user interacting with the floating image 14. A user sensor 27 can be positioned in a location that allows the user sensor 27 to detect a physical characteristic of the user (e.g., the user's line of sight or location of the user's eyes). In this example, the user sensor 27 is placed on the front panel and on the outside of said display case. Means to move (e.g., rotate) the display 11 (e.g., a positional assembly) such as a mechanical arm 30, can be included. The display 11 can be rotated in relation to the input from the user sensor 27 with the floating image 14 and displayed in the user's line-of-sight 31. The contactless interface can include a means to rotate the touch sensor 12. The touch sensor 12 can be rotated in conjunction with the display 11, resulting in the touch sensor 12 being positioned inline, or close to inline, to the floating image 14. A user sensor 27 can be placed on the front, side, and/or back of the interface to generate a signal that is used by a controller to turn the display on when a user is detected. The user sensor can be an ultrasonic, infrared (IR), VCSEL, LIDAR, or another type of sensor.

More examples of usage of a contactless sensor includes heads-up displays, which can be embedded into surfaces, walls, and other objects including, tables, vehicle dashboards, and service counters. In an example, the contactless interface can be used to save space (e.g., when compared to another display) by embedding it into a register counter or checkout a grocery store or another establishment. The contactless interface can be embedded in things such as a helmet, vehicle, or any other place that makes sense. In another example, a use case includes incorporating the interface into a vehicle dashboard, for example, a heads-up display, or in a laptop that is mounted in a car (again, to save space). Incorporation of augmented reality, virtual reality, machine learning, and/or artificial intelligence will enable many more possibilities and use cases.

In another embodiment, the interface is configured to be controlled by a combination of two or all three: hand gestures, voice control, and touching or interacting with the image in air. The advantage is being able to control the unit in multiple ways to make it a better experience for the end-user. The hand gestures can be achieved already by interacting with the image in air, but this is in reference to the gesture/input detection means 27 that would be either in or in any combination of: the front, sides, back, top, or bottom. The addition of a microphone for voice control, the gesture/input detection means, and the touch sensor module and/or other actuation detection means allows for multiple options to control the hologram apparatus. If you're performing surgery, you could suspend the unit above the patient and control the unit with gesture and/or voice control in addition to interacting with the in-air image eliminating the need for an assistant to control the PAC system or other software and the ability to control the unit from a distance. A use case example might be a surgeon operating on someone and having the hologram apparatus suspended over the patient whether from a ceiling, support arm, or something similar. Medical devices, cleanrooms, and manufacturing plants would benefit from the sterile controls and the ability to operate the hologram apparatus in multiple ways.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A contactless interface apparatus, comprising:
an image system configured to generate a floating image, the interface including
a light-emitting display; and
an optical device configured to form the floating image, the optical device having a first side and a second side, the first side aligned with the light-emitting display to receive light emitted from the light-emitting display and the second side configured to propagate light away from the optical device to form the floating image;

a first sensor assembly configured to determine information indicative of a physical characteristic of a user, and to generate a first signal corresponding to sensed information, wherein the physical characteristic includes a left eye outer corner position, a right eye corner position, a tip of the nose, an outer left corner of the mouth position, an outer right corner of the mouth position, and a chin position;

a second sensor assembly configured to determine location information of a user interaction with the floating image; and a controller having a computer hardware processor in communication with the image system, the controller configured to determine a facial orientation plane of the user based on the first signal, determine position information indicative of a position for displaying the floating image based on the facial orientation plane, and communicate the position information to the image system, wherein the image system is further configured to generate the floating image on a virtual image orientation plane that is aligned with the facial orientation plane based at least in part on the position information.

2. The contactless interface apparatus of claim 1, wherein the physical characteristic includes a position of at least three points relating to a user's eyes, nose, and mouth.

3. The contactless interface apparatus of claim 1, wherein the physical characteristic includes a position of the user relative to the contactless interface apparatus.

4. The contactless interface apparatus of claim 1, wherein the physical characteristic includes a distance of the user relative to the contactless interface apparatus.

5. The contactless interface apparatus of claim 1, wherein the physical characteristic includes one or more hand gestures of the user that are not interactions with the floating image.

6. The contactless interface apparatus of claim 1, wherein the image system comprises a positional assembly in communication with the controller, the image system further configured to receive the position information from the controller to and change a relative alignment of the light-emitting display and the optical device based on the position information to change the position of the floating image.

7. The contactless interface apparatus of claim 6, wherein the positional assembly is configured to rotate the light-emitting display to change an angular alignment of the light-emitting display relative to the optical device based on the position information.

8. The contactless interface apparatus of claim 7, wherein the positional assembly is configured to move the light-emitting display in at least one of an x, y, or z direction to change a position of the light-emitting display relative to the optical device based on the position information.

9. The contactless interface apparatus of claim 1, wherein the image system comprises a positional assembly coupled to the optical device and configured to move the optical device based on the position information.

10. The contactless interface apparatus of claim 9, wherein the positional assembly is configured to rotate the optical device to change an angular alignment of the optical device relative to the light-emitting display based on the position information.

11. The contactless interface apparatus of claim 9, wherein the positional assembly is configured to move the optical device in at least one of an x, y, or z direction to change a position of the optical device relative to the light-emitting display based on the position information.

12. The contactless interface apparatus of claim 1, wherein the image system comprises a positional assembly coupled to the light-emitting display and the optical device, and configured to move one or both of the light-emitting display and the optical device based on the position information to change the position of the floating image.

13. The contactless interface apparatus of claim 1, wherein the first sensor assembly comprises a camera, and wherein the controller is configured to generate the control signal using image processing software that identifies one or more of a user's height, position of the user's eyes, position of the user relative to the position of the floating image, or a user hand gesture.

14. The contactless interface apparatus of claim 1, wherein the first sensor assembly and second sensor assembly are the same sensor assembly and comprise a camera.

15. The contactless interface apparatus of claim 1, wherein the second sensor assembly comprises an infrared (IR) sensor array.

16. The contactless interface apparatus of claim 1, wherein the image system comprises a positional assembly coupled to the display and the optical device, and configured to move one or both of the display and optical device based on the position information to change the position of the floating image such that the virtual image orientation plane is parallel to the facial orientation plane.

17. A method of providing a contactless interface, the method comprising:

sensing, with a first sensor assembly, first information of a physical characteristic of a user who is in proximity of the contactless interface, wherein the physical characteristic includes a left eye outer corner position, a right eye corner position, a tip of the nose, an outer left corner of the mouth position, an outer right corner of the mouth position, and a chin position;

determining a facial orientation plane of the user based on the first information of the physical characteristic of the user; and generating a floating image on a virtual image orientation plane in a first position on the contactless interface based on the facial orientation plane.

18. The method of claim 17, further comprising:

sensing, with a second sensor assembly, a user interaction with the floating image, and generating a signal indicative of a user selection of a portion of the floating image based on the user interaction, and communicating the signal as a user input.

19. The method of claim 17, further comprising sensing second information of a physical characteristic of a user who is in the proximity of the contactless interface, and generating a floating image in a second position based on the second information.

20. The method of claim 17, wherein generating the floating image in the first position comprises aligning the virtual image orientation plane to be parallel with the facial orientation plane.

* * * * *